United States Patent
Tanimoto

(10) Patent No.: US 9,294,519 B2
(45) Date of Patent: Mar. 22, 2016

(54) FILE SERVER DEVICE

(71) Applicant: MURATA MACHINERY, LTD, Kyoto (JP)

(72) Inventor: Yoshifumi Tanimoto, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 98 days.

(21) Appl. No.: 13/650,180

(22) Filed: Oct. 12, 2012

(65) Prior Publication Data

US 2013/0138819 A1    May 30, 2013

Related U.S. Application Data

(62) Division of application No. 11/862,654, filed on Sep. 27, 2007, now Pat. No. 8,316,134.

(30) Foreign Application Priority Data

Oct. 11, 2006  (JP) .................................. 2006-277183
Oct. 11, 2006  (JP) .................................. 2006-277811
Oct. 11, 2006  (JP) .................................. 2006-277996

(51) Int. Cl.
*H04L 12/66* (2006.01)
*G06F 15/16* (2006.01)
(Continued)

(52) U.S. Cl.
CPC .......... *H04L 65/1073* (2013.01); *H04L 65/105* (2013.01); *H04L 65/1006* (2013.01); *H04L 67/14* (2013.01); *H04L 67/141* (2013.01); *H04L 67/148* (2013.01); *H04L 67/2814* (2013.01); *H04L 67/327* (2013.01)

(58) Field of Classification Search
USPC ................................................ 709/223, 227
See application file for complete search history.

(56) References Cited

U.S. PATENT DOCUMENTS 6,336,141 B1 * 1/2002 Fujiyama et al. ............. 709/224
7,206,088 B2 * 4/2007 Tanimoto ..................... 358/1.15
(Continued)

FOREIGN PATENT DOCUMENTS

JP    2004-213533 A    7/2004
JP    2004-229299 A    8/2004
(Continued)

OTHER PUBLICATIONS

Tanimoto, "Relay-Server Arranged to Carry Out Communications between Communication Terminals on Different LANS," U.S. Appl. No. 11/853,943, filed Sep. 12, 2007.
(Continued)

*Primary Examiner* — Natisha Cox
(74) *Attorney, Agent, or Firm* — Keating & Bennett, LLP

(57) ABSTRACT

Communication is established between communication terminals arranged in different LANS while realizing dynamic response to reduction in server load, movement of communication terminal, and the like. A relay server is arranged in a LAN and can communicate with an SIP server arranged in a WAN. For instance, a first relay server exchanges account information of the communication terminals in the respective LAN with a second relay server. If exchanged account information is changed in one relay server, the account information after the change is notified to the other relay server. One relay server determines the other relay server based on the exchanged account information and relays communication data between the communication terminals through the other relay server.

5 Claims, 20 Drawing Sheets

(51) Int. Cl.
*H04L 29/06* (2006.01)
*H04L 29/08* (2006.01)

(56) References Cited

U.S. PATENT DOCUMENTS

| | | | |
|---|---|---|---|
| 2002/0118398 A1* | 8/2002 | Tanimoto | 358/407 |
| 2002/0143922 A1* | 10/2002 | Tanimoto | 709/223 |
| 2002/0143956 A1* | 10/2002 | Tanimoto | 709/227 |
| 2002/0143957 A1* | 10/2002 | Tanimoto | 709/227 |
| 2003/0140637 A1 | 7/2003 | Masui et al. | |
| 2004/0218611 A1 | 11/2004 | Kim | |
| 2005/0144289 A1* | 6/2005 | Yoshiuchi et al. | 709/227 |
| 2005/0281251 A1* | 12/2005 | Yumoto et al. | 370/352 |
| 2007/0081530 A1* | 4/2007 | Nomura et al. | 370/389 |
| 2008/0147825 A1* | 6/2008 | Tanimoto | 709/218 |
| 2009/0073969 A1* | 3/2009 | Gobara et al. | 370/389 |

FOREIGN PATENT DOCUMENTS

| | | |
|---|---|---|
| JP | 2005-157699 A | 6/2005 |
| JP | 2006-202218 A | 8/2006 |
| JP | 2006-337021 A | 12/2006 |
| JP | 2007-310508 A | 11/2007 |
| JP | 2008-028600 A | 2/2008 |
| JP | 2008-092520 A | 4/2008 |
| JP | 2010-256989 A | 11/2010 |
| JP | 2010-267084 A | 11/2010 |
| JP | 2010-278636 A | 12/2010 |
| JP | 2011-160103 A | 8/2011 |

OTHER PUBLICATIONS

Tanimoto, "File Server Device Arranged in a Local Area Network and Being Communicable with an External Service Arranged in a Wide Area Network," U.S. Appl. No. 11/862,654, filed Sep. 27, 2007.
Tanimoto, "File Transfer Server," U.S. Appl. No. 11/870,622, filed Oct. 11, 2007.
Tanimoto, "Relay Server and Client Terminal," U.S. Appl. No. 11/953,351, filed Dec. 10, 2007.
Tanimoto, "Relay Server, Relay Communication System, and Communication Device," U.S. Appl. No. 11/944,495, filed Nov. 23, 2007.
Tanimoto, "Relay Server and Relay Communication System Arranged to Share Resources Between Networks," U.S. Appl. No. 11/953,505, filed Dec. 10, 2007.
Tanimoto, "Relay Server and Relay Communication System," U.S. Appl. No. 12/103,933, filed Apr. 16, 2008.
Tanimoto, "Relay Server and Relay Communication System," U.S. Appl. No. 12/112,127, filed Apr. 30, 2008.
Tanimoto, "Relay Server and Relay Communication System," U.S. Appl. No. 12/107,793, filed Apr. 23, 2008.
Tanimoto, "Relay Server and Relay Communication System," U.S. Appl. No. 12/270,883, filed Nov. 14, 2008.
Tanimoto, "Relay Server ADN Relay Communication System," U.S. Appl. No. 12/335,642, filed Dec. 16, 2008.
Tanimoto, "Relay Server and Relay Communication System," U.S. Appl. No. 12/335,661, filed Dec. 16, 2008.
Tanimoto, "Relay and Server Relay Communication System," U.S. Appl. No. 12/370,868, filed Dec. 22, 2008.
Tanimoto, "Relay Device and Relay Communication System," U.S. Appl. No. 11/723,466, filed Mar. 20, 2007.
Tanimoto, "Relay Server, Communication System and Facsimile System," U.S. Appl. No. 10/045,698, filed Jan. 10, 2002.
Tanimoto, "Relay Server, Communication System and Facsimile System," U.S. Appl. No. 10/045,897, filed Jan. 10, 2002.
Tanimoto, "Relay Server for Relaying Communications Between Network Devices," U.S. Appl. No. 10/114,720, filed Apr. 1, 2002.
Tanimoto, "Relay Server," U.S. Appl. No. 10/114,963, filed Apr. 2, 2002.
Tanimoto, "Relay Server, Network Device, Communication System, and Communication Method," U.S. Appl. No. 10/116,615, filed Apr. 2, 2002.
Tanimoto, "First Relay Server and Second Relay Server," U.S. Appl. No. 13/255,958, filed Sep. 12, 2011.
Tanimoto, "First Server and Relay Communication System," U.S. Appl. No. 13/061,234, filed Feb. 28, 2011.
Tanimoto, "Relay Device and Communication System," U.S. Appl. No. 13/341,711, filed Dec. 30, 2011.
Tanimoto, "Relay Communication System and First Relay Server," U.S. Appl. No. 13/320,034, filed Nov. 11, 2011.
Tanimoto, "Relay Communication System and Access Manangement Apparatus," U.S. Appl. No. 13/390,561, filed Feb. 15, 2012.
Tanimoto, "Relay Server and Relay Communication System," U.S. Appl. No. 13/496,664, filed Mar. 16, 2012.
Tanimoto, "Relay Server, Relay Communication System, and Comuication Apparatus," U.S. Appl. No. 13/061,725, filed Mar. 2, 2011.
Tanimoto, "Relay Server, Relay Communication System, and Comuication Apparatus," U.S. Appl. No. 13/610,172, filed Sep. 11, 2012.
Tanimoto, "Relay Server and Relay Communication System Arranged to Share Resources Between Networks." U.S. Appl. No. 13/153,497, filed Jun. 6, 2011.
Inai et al., "A Scalable Log Collecting Scheme for Host-Based Traffic Monitoring System," Information Processing Society of Japan Symposium Series, vol. 2008, No. 1, Jul. 2, 2008, 27 pages.

* cited by examiner

FIG. 14

| COMMUNICATION TERMINAL | ACCOUNT |
|---|---|
| COMMUNICATION TERMINAL 2011 | sip0001@privatesip |
| COMMUNICATION TERMINAL 2012 | sip0011@privatesip |
| COMMUNICATION TERMINAL 2021 | sip0002@privatesip |
| COMMUNICATION TERMINAL 2022 | sip0022@privatesip |
| COMMUNICATION TERMINAL 2051 | sip0003privatesip |
| COMMUNICATION TERMINAL 2052 | sip0033@privatesip |

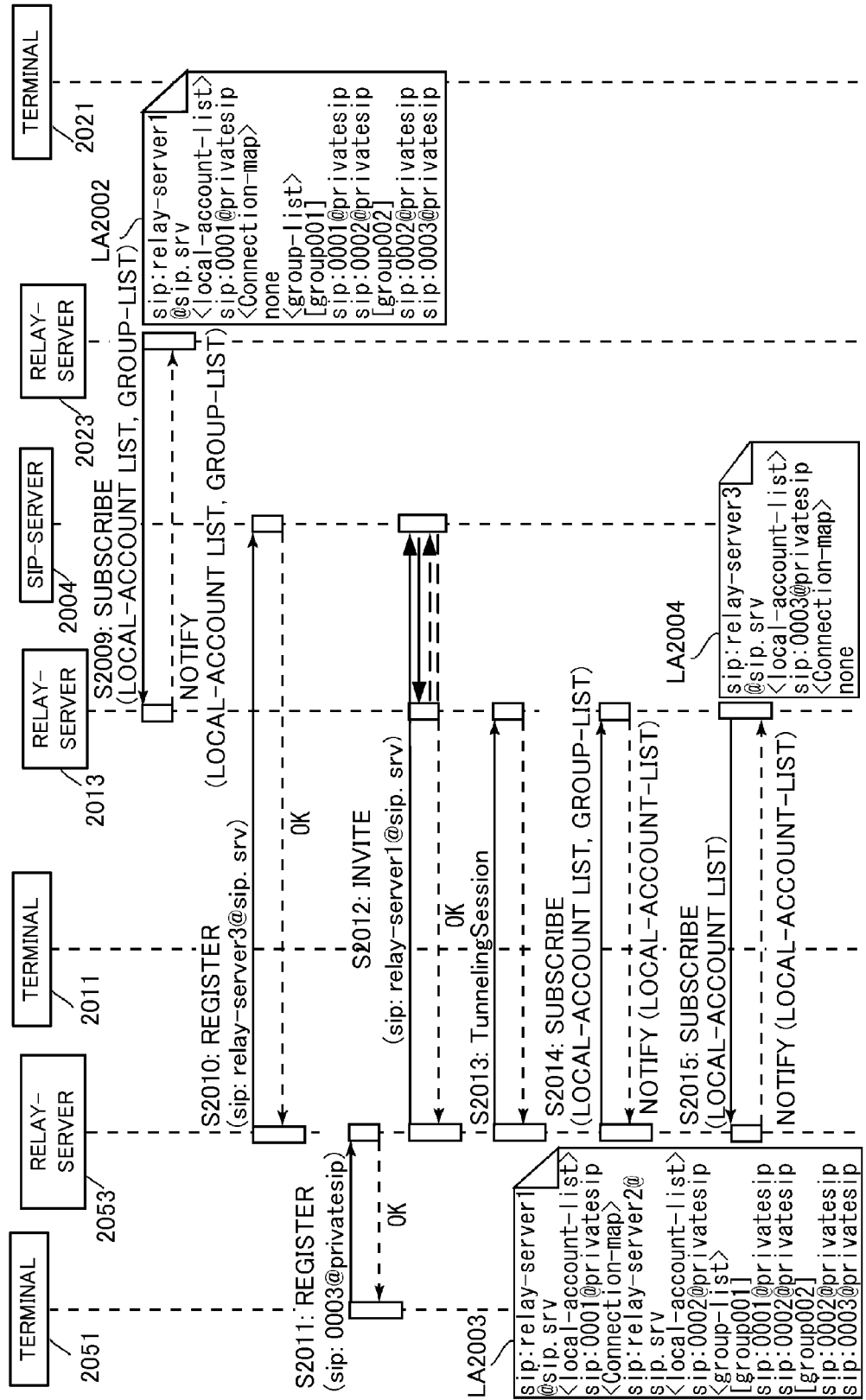

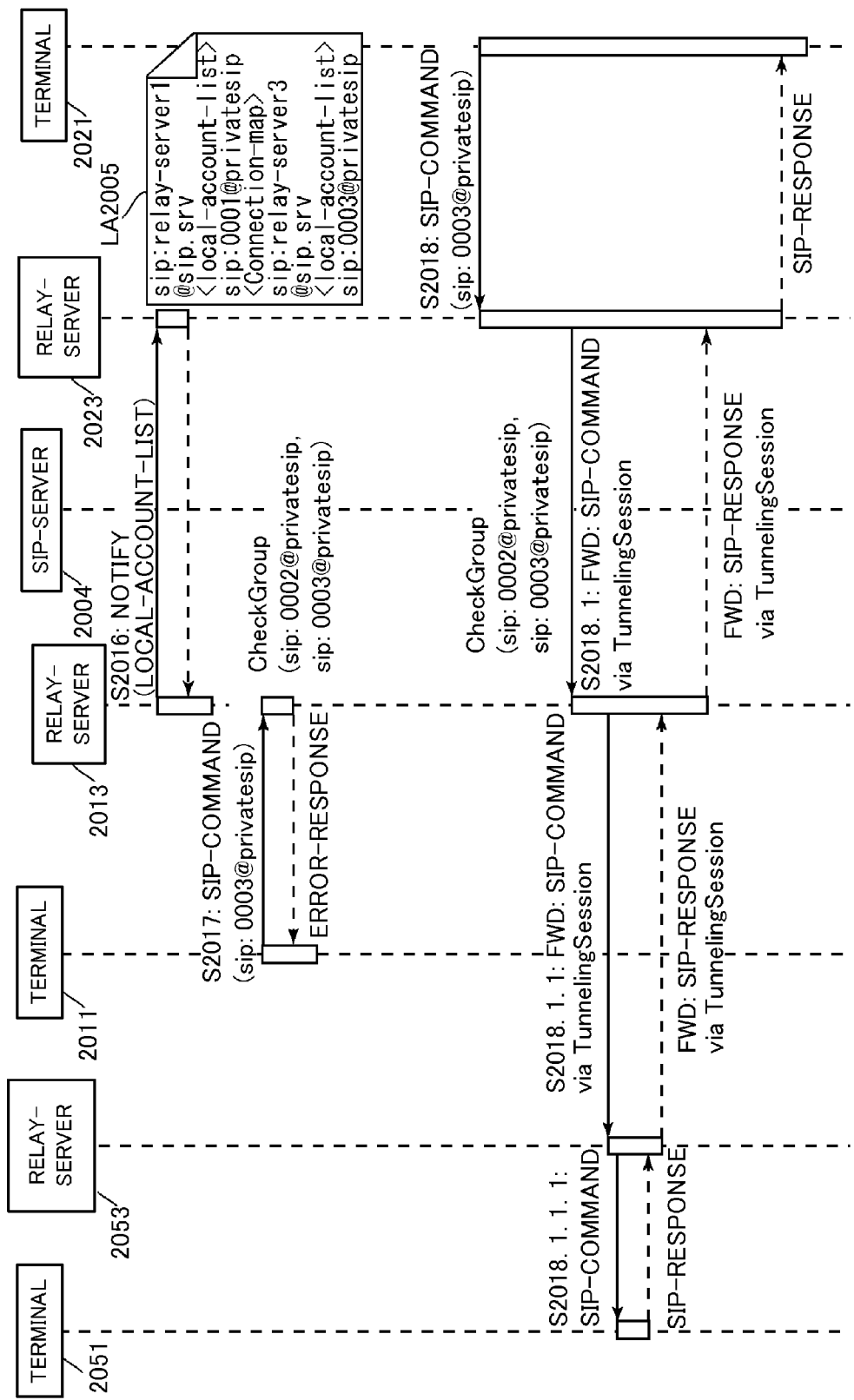

FILE SERVER DEVICE

CROSS-REFERENCE TO RELATED APPLICATIONS

This application claims priority under 35 U.S.C. 119 to Japanese Patent Application No. 2006-277183, filed on Oct. 11, 2006, No. 2006-277811, filed on Oct. 11, 2006 and No. 2006-277996, filed on Oct. 11, 2006, which applications are hereby incorporated by reference in their entirety.

BACKGROUND OF THE INVENTION

1. Field of the Invention

The present invention relates to a technique in which communication terminals in a plurality of different LANs (Local Area Networks) communicate over a WAN (Wide Area Network), in particular, to a communication technique between relay servers for relaying the communication.

2. Description of the Related Art

The communication terminals in the different LANs can directly communicate with each other over a WAN using a call control protocol such as SIP (Session Initiation Protocol) and DDNS (Dynamic Domain Name System). This is a technique referred to as a so-called VPN (Virtual Private Network), where different LANs at remote locations can be used as if the LANs are in a directly connected network.

Through the use of such technique, the LANs of a central office and a branch office can be connected, and the terminals connected to the respective LAN can communicate via the Internet.

Conventionally, a technique enabling the communication terminals connected to different LANs to communicate via the Internet has been known. In this technique, the different communication terminals connected to the different LANs log into a relay server connected to the Internet through the respective gateway to establish a communication path with the relay server. The communication terminals are thus able to communicate via the Internet using such a communication path. This technique is a technique that realizes communication between LANs using the relay server existing on the WAN.

When using the SIP, the account information of each communication terminal is generally registered in the SIP server. That is, the account information of the communication terminal is registered in the SIP server by issuing a REGISTER method to the SIP server from each communication terminal. When the communication terminal makes a communication request in which an account of another communication terminal is specified, the SIP server relays the communication for session establishment according to the registered account information.

When performing the communication using the SIP between a great number of LANs, a great number of account information of the communication terminals are registered in the SIP server, and thus the load of the server becomes very large. That is, the accounts of the communication terminals arranged in all the LANs were registered in the server that comprehensively manages the communication terminals in order to connect a great number of LANs and perform communication between the great number of LANs in the conventional art, and thus the load of the server is very large.

When the communication terminal existing in the network moves from one LAN to another LAN, the account information of the relevant communication terminal that is already registered becomes unnecessary, and thus the account information of the relevant communication terminal must be newly registered at the destination, in which case, management becomes difficult and troublesome, and furthermore, response to movement or the like of the communication terminal cannot be achieved in real time.

SUMMARY OF THE INVENTION

In order to overcome the above problems, preferred embodiments of the present invention provide a technique enabling communication between the communication terminals arranged in different LANs while reducing server load, and achieving dynamic response with respect to movement or the like of the communication terminal.

The load of the SIP server can be alleviated by entrusting the management of the communication terminal to the relay server. However, in this case as well, each relay server must establish a relay communication session that is directly communicable with another relay server to relay the communication data, thereby complicating the relay communication session established between the relay servers, and increasing the communication load.

Furthermore, when the registered account information changes due to movement of the communication terminal and the like, the communication session between the relay servers that is already established becomes unnecessary, and a new relay session must be established at the destination, in which case, management becomes difficult and troublesome, and furthermore, response cannot be achieved in real time.

In order to overcome the above-described problems, preferred embodiments of the present invention provide a technique enabling communication between the communication terminals arranged in different LANs while reducing the server load, reducing the communication load between the relay servers and achieving dynamic response with respect to movement or the like of the communication terminal.

Moreover, a virtual private network group can be established between the terminals connected to different LANs by using VPN and the like. However, in this type of private network group, changes in the registered state of the account of the communication terminal such as when the communication terminal participating in the network group moves to a different network group cannot be easily responded to, that is, cannot be dynamically responded to.

In order to solve the above-described problems, preferred embodiments of the present invention provide a technique of dynamically responding even if the registered state of the private network group changes due to movement or the like of the communication terminal.

In order to overcome the problems described above, the relay server according to a preferred embodiment of the present invention relates to a relay server arranged in a local area network and being communicable with an external server arranged in a wide area network; the relay server including a local account information registering section arranged to register account information of a communication terminal in the local area network; a registration section arranged to register the relay server account information in the external server; a relay server specifying section arranged to specify another relay server registered in the external server and to establish a relay communication session that is directly communicable with the other relay server; an account information exchange section arranged to exchange account information held in the local account information registering section with the other relay server; a change notification setting section arranged to request, when account information held in the other relay server is changed, the other relay server to transmit the account information after a change; and an another relay server determination section arranged to determine, when receiving a communication request in which an account of a communication terminal in another local area network is specified from the communication terminal in the local area network, another relay server in which the specified account is registered from the account information exchanged with the other relay server, and to relay communication data between the communication terminals through a relay communication session with the determined other relay server.

In the relay server according to a preferred embodiment of the present invention, whether or not to request for transmission of the account information after a change when the account information of the other relay server is changed is specifiable when establishing the relay communication session that is directly communicable with the other relay server.

In the relay server according to a preferred embodiment of the present invention, whether or not to include the account information to be registered in the account information to be transmitted to the other relay server is specifiable when registering the account information from the communication terminal of the local area network.

A preferred embodiment of the present invention relates to a relay server arranged in a local area network and being communicable with an external server arranged in a wide area network. The relay server includes an exchange section arranged to exchange relay information related to a relay communication session with another relay server arranged in another local area network; where whether or not a relay communication session that is directly communicable with the other relay server arranged in the other local area network is established when relaying communication data to a communication terminal in the other local area network is detected, and when it is detected that the relay communication session that is directly communicable with the other relay server is not established, the communication data is indirectly relayed through another further relay server, to which a relay communication session is established, based on the relay information exchanged by the exchange section.

A relay server according to a preferred embodiment of the present invention further includes a local account information registering section arranged to register account information of a communication terminal in the local area network; a register section arranged to register the relay server account information in the external server; an another relay server specifying section arranged to specify another relay server registered in the external server and to establish a relay communication session that is directly communicable with the other relay server; a relay information registering section arranged to register relay information including relay path information of the established relay communication session; an account information exchange section arranged to exchange account information held in the local account information registering section with the other relay server; a relay information exchange section arranged to exchange the relay information held by the relay information registering section with the other relay server; a change notification setting section arranged to request, when the relay information held by the other relay server is changed, the other relay server to transmit the relay information after change; an another relay server determining section arranged to determine, when receiving a communication request in which an account of another communication terminal is specified from the communication terminal in the local area network, another relay server in which the specified account is registered from the account information exchanged with the other relay server, and to detect whether or not a directly communicable relay communication session is established with the determined other relay server; and a relay path determining section arranged to determine a relay path from the relay information if the directly communicable relay communication session is not established, and to relay the communication data between the communication terminals through a relay communication session with another relay server on the relay path.

In the relay server according to a preferred embodiment of the present invention, whether or not to request for transmission of the relay information after a change if the relay information of an opposing relay server is changed is specifiable when establishing the relay communication session that is directly communicable with the other relay server.

In the relay server according to a preferred embodiment of the present invention, whether or not to include the relay path information formed by the communication session in the relay information is specifiable when establishing a directly communicable relay communication with the other relay server.

The relay server according to a preferred embodiment of the present invention relates to a relay server arranged in a local area network and being communicable with an external server arranged in a wide area network; the relay server including an account registering section arranged to register account information of a communication terminal in the local area network; an account registering section arranged to register account information of the relay server in the external server; an another relay server specifying section arranged to specify another relay server registered in the external server and to establish a relay communication session that is directly communicable with the other relay server; an exchange section arranged to exchange held account information with the other relay server; a registering section arranged to register group information in which account information of the communication terminals are grouped; and a judging section arranged to judge, when receiving a communication request in which an account of another communication terminal is specified from the communication terminal in the local area network, whether or not both communication terminals are registered in a same group based on the held group information, and determining a relay server based on the held account information if both communication terminals are registered in the same group, and to relay communication data between the communication terminals through a relay communication session with the determined relay server.

The relay server according to a preferred embodiment of the present invention further includes a requesting section arranged to request the other relay server to transmit the group information when the relay server does not hold the group information.

The relay server according to a preferred embodiment of the present invention further includes a requesting section arranged to request, when the group information held by the relay server is changed, the other relay server to transmit the group information after a change.

The relay server according to a preferred embodiment of the present invention further includes an accepting section arranged to accept a communication request of the group information from the communication terminal and to extract and transmit the group information related to the communication terminal.

The relay server according to a preferred embodiment of the present invention further includes a receiving section arranged to receive the group information from the communication terminal and to update the held group information.

According to the relay server of various preferred embodiments of the present invention, a communication terminal connected to a LAN can communicate with a communication terminal connected to another LAN via the Internet.

When exchanging the account information of the communication terminals in the LANs with another relay server and if the exchanged account information is changed, the account information after a change is notified each time, and thus, the account information of the relevant communication terminal is updated automatically and in real time, whereby dynamic response is achieved even if the registered account information changes by registering request, movement, and the like of the communication terminal.

When registering in the relay server, each communication terminal can specify whether or not to notify the account information changed thereby to another relay server, where its own presence is maintained in a secret state if specified not to notify. The relay server can specify whether or not to request for change notification of the account information by a notification event when establishing a relay communication session with another relay server.

Furthermore, according to the relay server of various preferred embodiments of the present invention, a communication terminal connected to a LAN can communicate with a communication terminal connected to another LAN via the Internet. Each relay server does not necessarily need to establish a direct communication path. Indirect relay via the relay server is also possible, whereby the communication load between the relay servers is reduced. Since the relay server establishes the communication path automatically and in real time, dynamic response is achieved even if the communication terminal moves.

When establishing the relay path, the relay server can specify whether or not to request for change notification and the like to the opposing relay server, and can also maintain a secret state without including the established relay path information in the relay information.

A private network can be freely configured and communicated by establishing a communication system using the relay server according to various preferred embodiments of the present invention. If the group information is registered or updated in any one of the relay servers, the group information can be shared in chain reaction through transmission and reception between the relay servers, and thus can be easily responded.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 14 is a conceptual view describing an account management of communication terminals.

FIG. 19 is a sequence diagram of the communication process.
FIG. 20 is a sequence diagram of the communication process.

DETAILED DESCRIPTION OF PREFERRED EMBODIMENTS

First Preferred Embodiment

Figure 1:
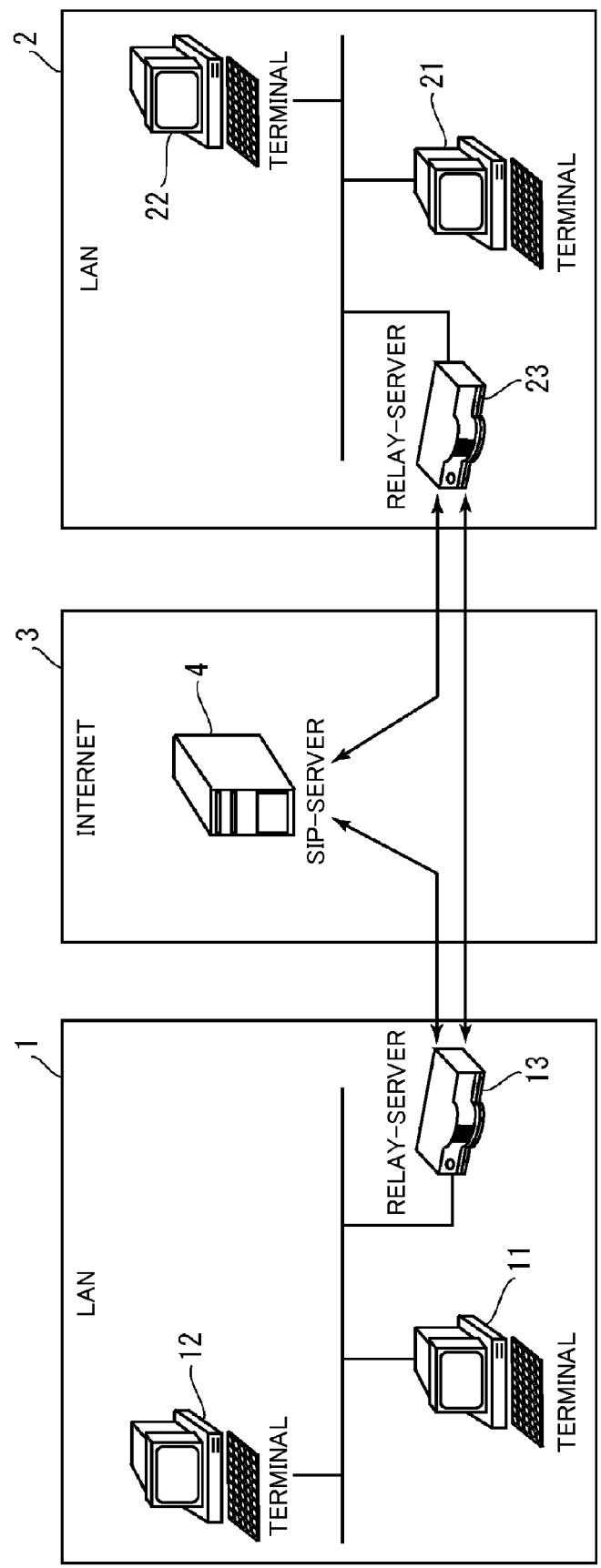
FIG. 1 is a network configuration view of a communication system according to a first preferred embodiment of the present invention.

A first preferred embodiment of the present invention will now be described with reference to the drawings. FIG. 1 is an overall view of a communication system according to the present preferred embodiment. The communication system preferably includes an Internet 3, and two LANs 1 and 2 connected to the Internet 3. The LANs 1, 2 are networks at physically remote locations. For example, the LAN 1 is a local network in a central office building, whereas the LAN 2 is a local network in another branch office building, where the two LANs 1 and 2 are respectively connected to the Internet 3, which is a global network.

As illustrated in the figure, communication terminals 11, 12 are connected to the LAN 1. The communication terminals 11, 12 are respectively given a private IP address. Generally, a private IP address managed uniquely only in the LAN is given to the terminal connected to the LAN. The LAN 1 is connected with a relay server 13. The relay server 13 is connected to the LAN 1 and is also connected to the Internet 3. A LAN interface private IP address and a WAN interface global IP address are given to the relay server 13.

Communication terminals 21, 22 given a private IP address are connected to the LAN 2. The LAN 2 is connected with a relay server 23. The relay server 23 is connected to the LAN 2 and is also connected to the Internet 3, and is given an LAN interface private IP address and a WAN interface global IP address.

An SIP server 4 is connected to the Internet 3. The SIP server 4 functions as a proxy server for relaying an SIP method and response, and functions as a SIP register server for registering the account of the relay servers 13, 23 when the relay servers 13, 23 perform the communication using the SIP (Session Initiation Protocol).

The relay server 13 connected to the LAN 1 functions as a SIP register server for registering the accounts of the communication terminals 11, 12, and the like connected to the LAN 1 using the SIP.

Figure 2:
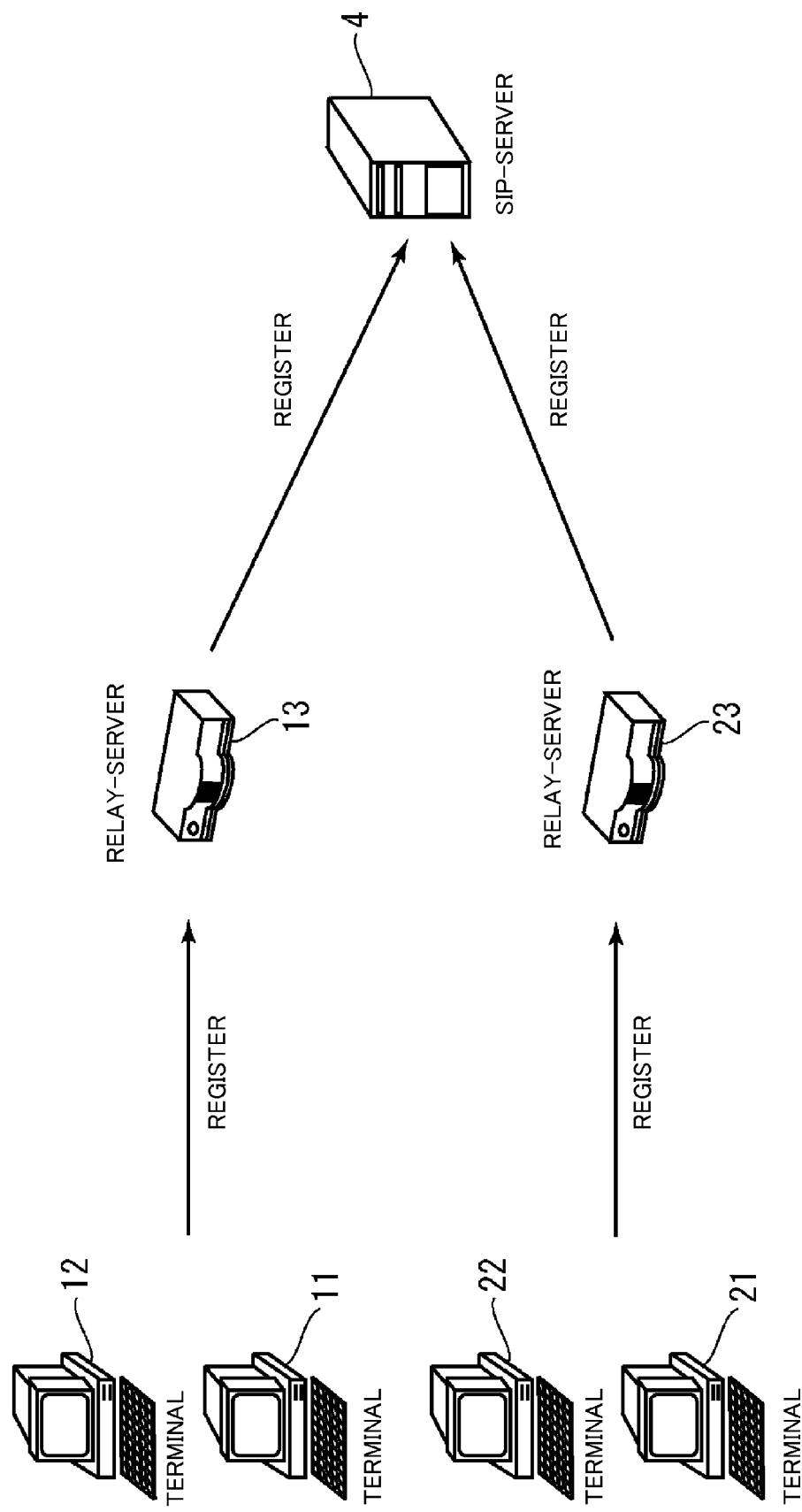
FIG. 2 is a view showing a relationship of communication terminals and relay servers, and a relationship between the relay servers and a SIP server.

That is, as illustrated in FIG. 2, the relay server 13 functions as the SIP register server to register the account based on a registration request (REGISTER) received from the communication terminals 11, 12 in relation with the communication terminals 11, 12, and functions as a client to transmit the registration request (REGISTER) of the account to the SIP server 4 in relation with the SIP server 4.

Similarly, the relay server 23 connected to the LAN 2 functions as a SIP register server to register the accounts of the communication terminals 21, 22, and the like connected to the LAN 2 using the SIP.

That is, as illustrated in FIG. 2, the relay server 23 functions as the SIP register server for registering the account based on the registration request (REGISTER) received from the communication terminals 21, 22 in relation with the communication terminals 21, 22, and functions as a client for transmitting the registration request (REGISTER) of the account to the SIP server 4 in relation with the SIP server 4.

Figure 3:
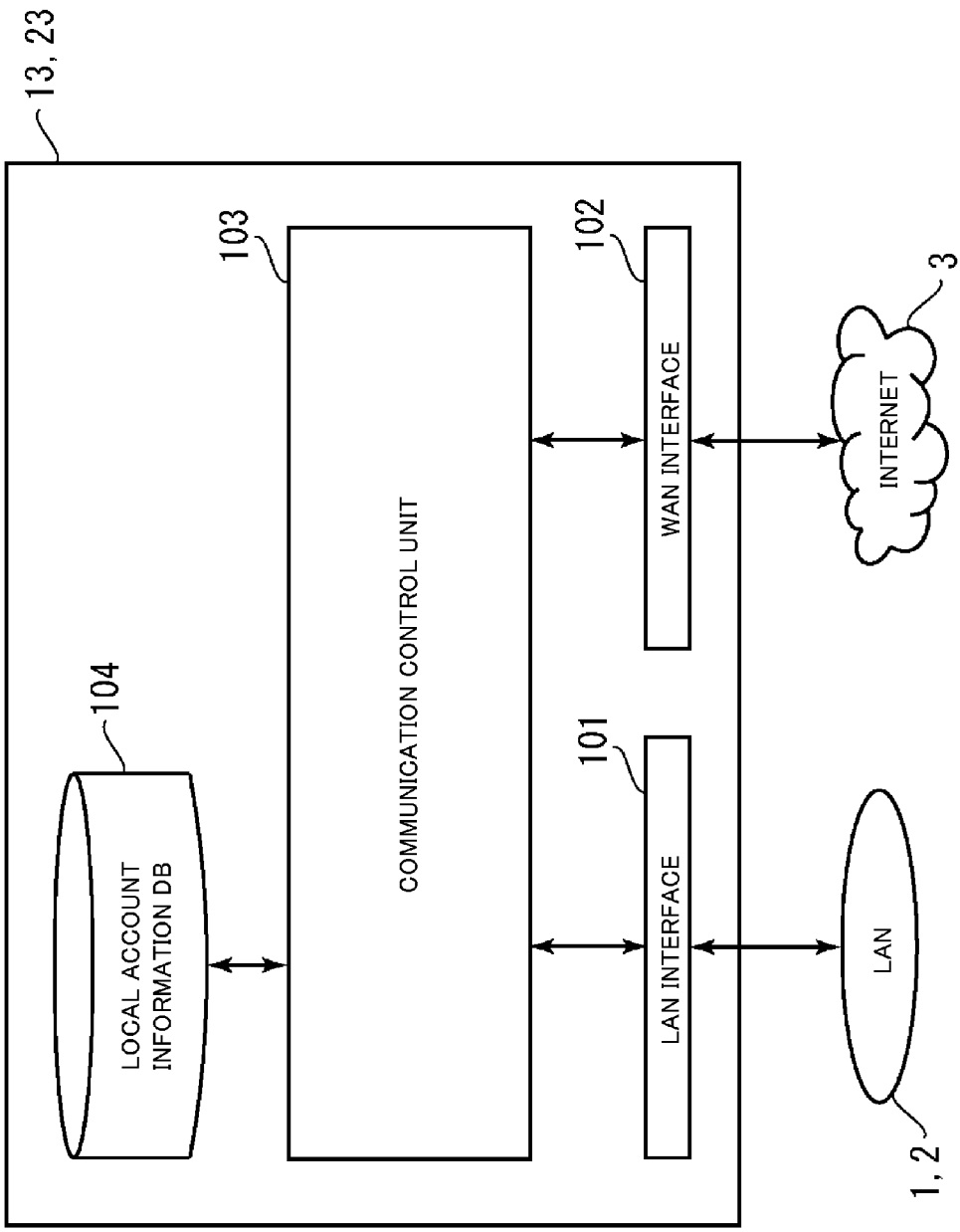
FIG. 3 is a functional block diagram of the relay server.

FIG. 3 is a functional block diagram of the relay servers 13, 23. The relay servers 13, 23 preferably have a similar function, and thus will be described using the same figure. The relay servers 13, 23 preferably include a LAN interface 101, a WAN interface 102, a communication control unit 103, and a local account information database 104.

The LAN interface 101 is an interface that performs communication with the communication terminal connected to the LAN using the private IP address. That is, the relay server 13 performs communication with the communication terminals 11, 12 using the LAN interface 101, and the relay server 23 performs communication with the communication terminals 21, 22 or the like using the LAN interface 101.

The WAN interface 102 is an interface that performs communication with the SIP server 4 connected to the Internet 3, which is the global network, and other communication servers connected to the Internet 3 and communication terminals using the global IP address. In the present preferred embodiment, the relay server preferably is configured with the WAN interface, but a connection to the WAN may be performed by a router and the relay server may be arranged to serve therebelow.

The communication control unit 103 preferably is a processing unit for controlling various communications performed through the LAN interface 101 and the WAN interface 102. The communication control unit 103 controls various communication processes according to protocols such as TCP/IP, UDP, SIP or the like.

One function of the communication control unit 103 is to receive the registration request (REGISTER) of the account from the communication terminal connected to the LAN, and to register the account information of the communication terminal in the local account information database 104. For example, the relay server 13 receives the registration request (REGISTER) of the account from the communication terminal 11 and registers the account information of the communication terminal 11 in the local account information database 104.

The communication control unit 103 executes the process of exchanging account information with another relay server, transmitting its own account information to the relay server thereof, receiving the account information of the relevant relay server, and registering the information in its own local account information database 104. When the account information held by the relay server is changed, a change notification setting for requesting to continuously transmit change notification and account information after a change is performed on the other relay server, where a process of transmitting the change notification and the account information after a change to the relay server in which the change notification setting is performed is executed when the account information of the device is changed. This process is performed using a notification event performed by the methods of SUBSCRIBE and NOTIFY in the SIP as hereinafter described. The period of executing the notification event is set in the notification event. When the change notification setting using the notification event is performed by transmitting the SUBSCRIBE method through operator control or the like, if the account information of the relay server on a side receiving the SUBSCRIBE method is changed thereafter during the period the notification event can be executed, the change notification and the notification of the new account information are performed every time to the relay server on a side transmitting the SUBSCRIBE method by the NOTIFY method.

The notifying account information is registered in the local account information database 104. If a change is made, the content after change is registered every time, and continuously updated.

When the communication terminal connected to the LAN transmits the registration request (REGISTER) of the account to the relay server, the account information registered in the relay server is changed. When the account information is changed, a series of processes related to changing the account information is executed by the previous change notification setting, but whether or not to include the account information to be registered in the account information to be transmitted to another relay server can be specified in the registration request (REGISTER). That is, the communication terminal can maintain its own presence or identity in a secret state with respect to the relay server of the other LAN.

When establishing a relay communication session that is directly communicable with another relay server by the INVITE method, the relay server can specify whether or not to request for transmission of the change notification and the account information after change can be specified when the account information of the opposing relay server is changed. That is, whether or not to request the change notification of the account information to the opposing relay server is selectable.

Furthermore, when receiving the communication request specifying the account of the communication terminal in another LAN from the communication terminal in the same LAN, the communication control unit 103 determines the relay server in which the account specified from the account information exchanged with another relay server is registered, and performs a control to relay the communication data between the communication terminals through the relay communication session with the relevant relay server.

The communication control unit 103 has a function of transmitting the registration request (REGISTER) for performing account registration of the relay server to the SIP server 4.

The communication control unit 103 also has a function of connecting and maintaining a tunneling session between the relay server 13 and 23 on the opposing side. That is, the relay server 13, 23 transmits the INVITE method of SIP from either one to establish the tunneling session between the relay servers 13 and 23. The communication control unit 103 of the relay servers 13, 23 maintains the established tunneling session to relay the communication data between the communication terminals connected to the LANs 1, 2.

In other words, since a private account is provided to the communication terminals connected to the LANs 1, 2, the private account of the destination is specified when communicating with the communication terminal arranged in a different LAN 1, 2. However, the communication data such as an SIP command in which the private account is specified is encapsulated between the relay servers 13, 23 and relayed to the other relay servers 13, 23. The relay server 13, 23 on the receiving side retrieves the relayed SIP command and relays and transmits the communication data specifying the private account to the corresponding communication terminal.

Figure 4:
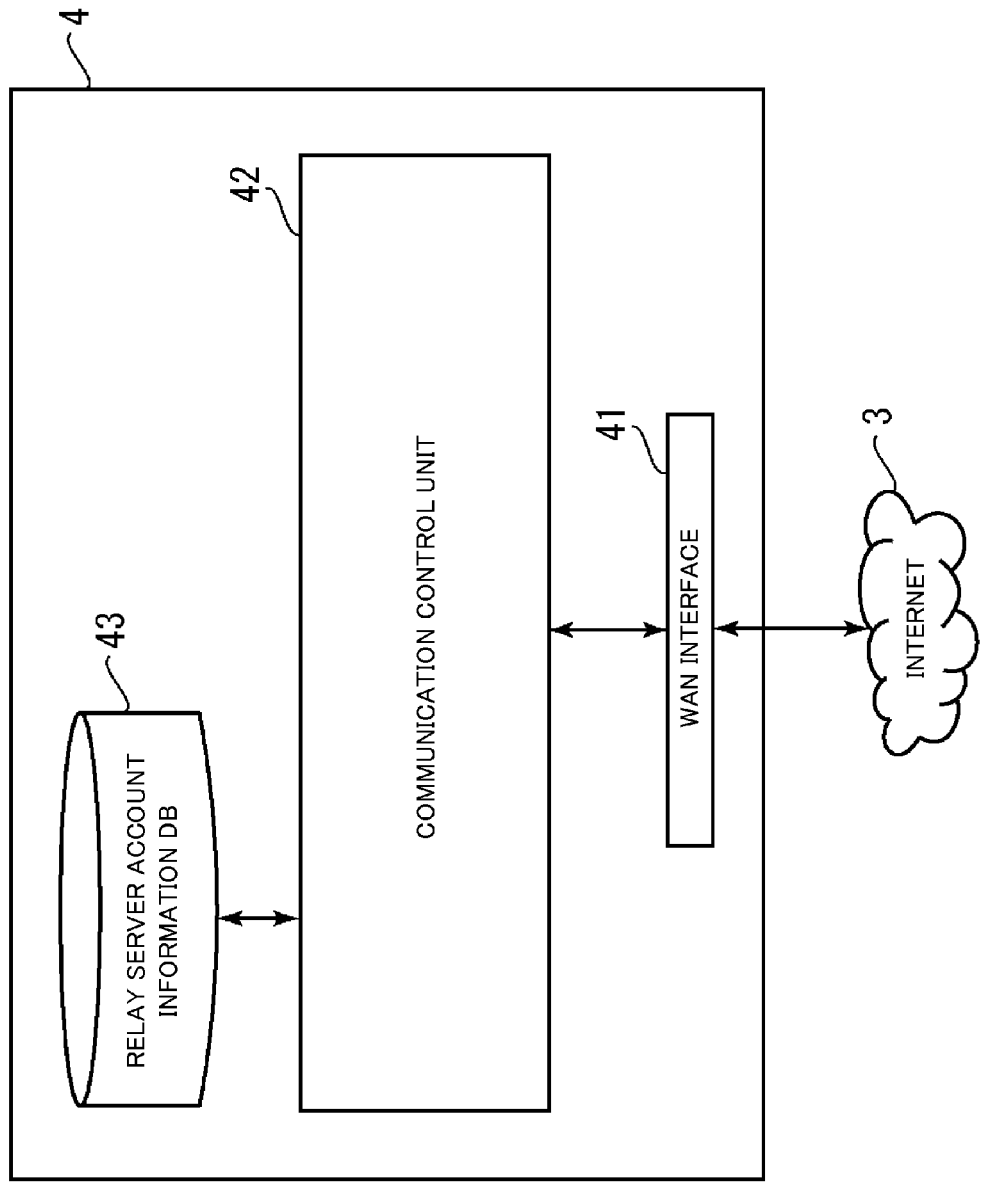
FIG. 4 is a functional block diagram of the SIP server.

FIG. 4 is a functional block diagram of the SIP server 4. As illustrated in the figure, the SIP server 4 includes a WAN interface 41, a communication control unit 42, and a relay server account information database 43.

The WAN interface 41 is an interface that performs communication with the server connected to the Internet 3 or the terminal using the global IP address. The SIP server 4 can communicate with the relay servers 13, 23 using the WAN interface 41.

The communication control unit 42 preferably is a processing unit for controlling various communications performed through the WAN interface 41. The communication control unit 42 controls communication processes according to protocols such as TCP/IP, UDP, SIP, or the like.

One function of the communication control unit 42 is to receive the registration request (REGISTER) of the account from the relay server connected to the Internet 3, and to register the account information of the relay server in the relay server account information database 43. For instance, the SIP server 4 receives the registration request (REGISTER) of the account from the relay server 13, and registers the account information of the relay server 13 in the relay server account information database 43.

The communication control unit 42 also has a function of relaying communication data such as various SIP methods and responses transmitted from one of the relay servers 13, 23 to the other relay server.

Figure 5:
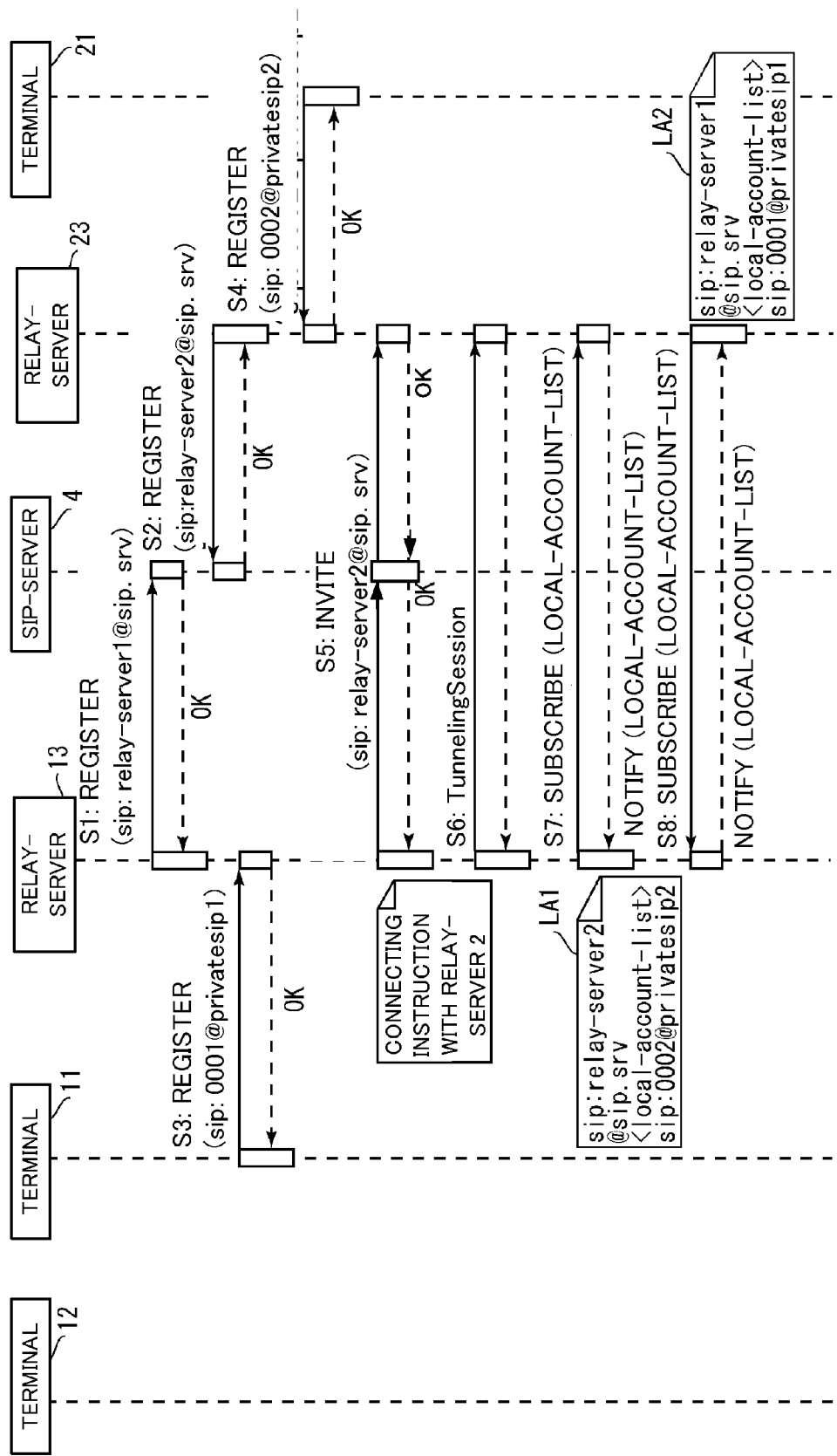
FIG. 5 is a sequence diagram of a communication process.
Figure 6:
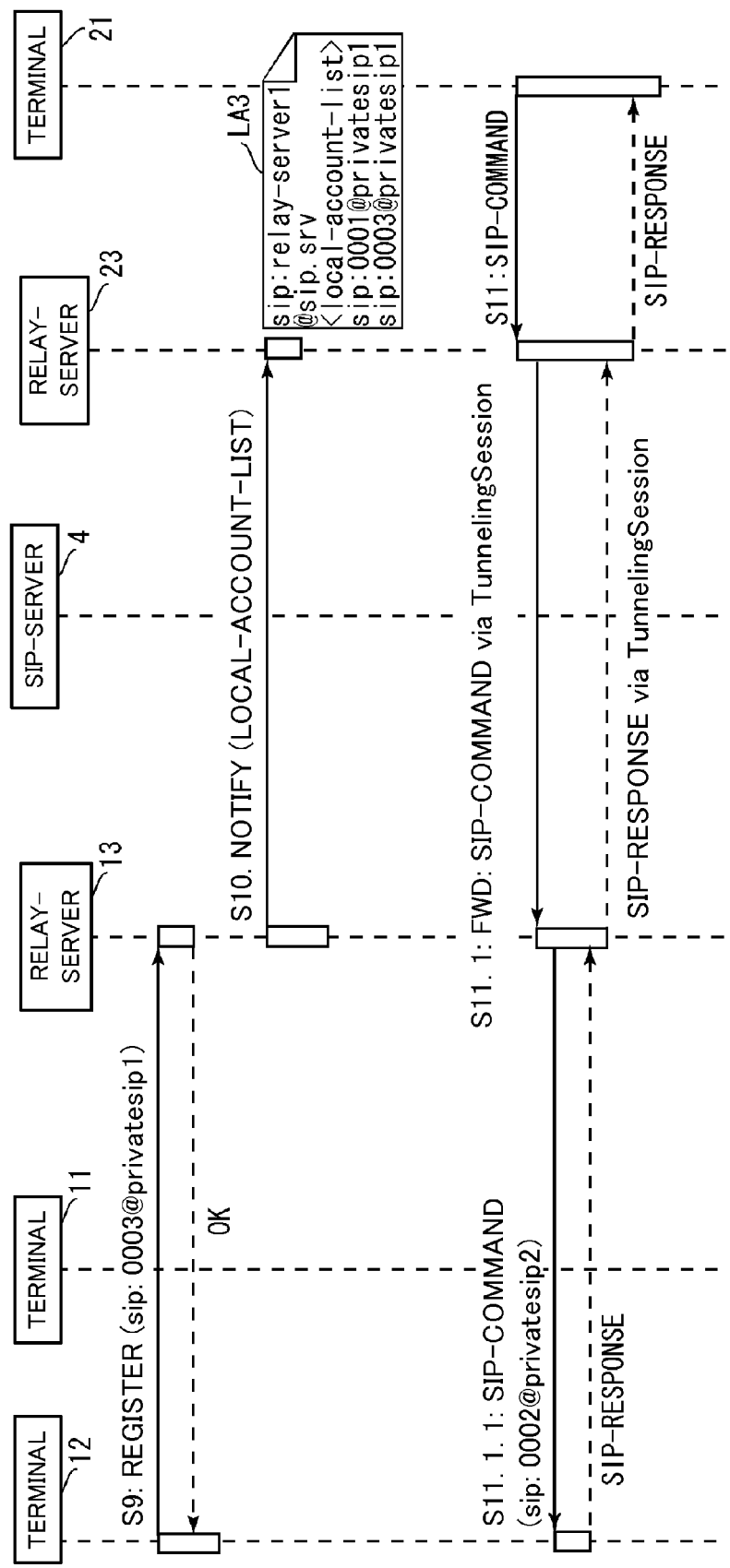
FIG. 6 is a sequence diagram of the communication process.

The flow of communication processes in the communication system configured as described above will now be described with reference to the processing sequence diagrams of FIGS. 5 and 6. FIG. 5 shows a sequence from step S1 to step S8, and FIG. 6 shows a sequence from step S9 to step S11.

First, the relay server 13 transmits the registration request (REGISTER) of the account to the SIP server 4 (step S1). As illustrated in FIG. 5, the relay server 13 makes a registration request of its account (SIP: relay-server1@sip.srv). The SIP server 4 returns an OK response to the relay server 13, whereby the account of the relay server 13 and the global IP address of the relay server 13 are registered in the relay server account information database 43 in correspondence to each other. When performing a password authentication, the account of the relay server and a password are registered in the relay server account information database 43 in advance in correspondence to each other. In this case, the user transmits the password with the registration request. If password authentication is successful, the account is registered in correspondence to the IP address.

Subsequently, the relay server 23 transmits the registration request (REGISTER) to the SIP server 4 (step S2). The relay server 23 makes the registration request of its account (SIP: relay-server2@sip.srv). The SIP server 4 returns an OK response to the relay server 23, whereby the account of the relay server 23 and the global IP address of the relay server 23 are registered in the relay server account information database 43 in correspondence to each other. Similarly, the password authentication may be performed.

The communication terminal 11 then transmits the registration request (REGISTER) of the account to the relay server 13 (step S3). The communication terminal 11 makes a registration request of its account (SIP: 0001@privatesip1). The relay server 13 returns an OK response, whereby the account of the communication terminal 11 and the private IP address of the communication terminal 11 are registered in the local account information database 104 in correspondence to each other. When performing a password authentication, the account of the communication terminal and a password are registered in the local account information database 104 in advance in correspondence to each other. In this case, the user transmits the password with the registration request. If password authentication is successful, the account is registered in correspondence to the IP address.

The communication terminal 21 then transmits the registration request (REGISTER) of the account to the relay server 23 (step S4). The communication terminal 21 makes a registration request of its account (SIP:0002@privatesip2). The relay server 23 returns an OK response, whereby the account of the communication terminal 21 and the private IP address of the communication terminal 21 are registered in the local account information database 104 in correspondence to each other. In this case as well, password authentication may be performed.

Accordingly, the account registration of the relay servers 13, 23 with respect to the SIP server 4 is completed, and the account registration of the communication terminals 11, 21 with respect to the relay servers 13, 23 is completed.

The relay server 13 then transmits a connection request command (INVITE method) with respect to the relay server 23 to the SIP server 4 (step S5). The account (SIP:relay-server2@sip.srv) of the relay server 23 of connection request destination is specified in the INVITE method. The SIP server 4 references the relay server account information 43 to acquire the global IP address of the relay server 23. The SIP server 4 then relays the INVITE message transmitted from the relay server 13 to the relay server 23.

When the connection request command is transmitted from the relay server 13 to the relay server 23, an OK response is transferred from the relay server 23 to the relay server 13 via the SIP server 4. If the connection request command is accepted in such a manner, a tunneling session is established between the relay servers 13, 23 (step S6).

The processes from step S1 to S6 are generally performed as an initial setting of the network by the operator. The operator performs the operation of registering in the SIP server 4, the relay server arranged in the LAN that the operator desires to connect to via the Internet 3. The operator also performs the operation of registering in the relay server the communication terminal to which the operator desires to communicate to via the Internet 3.

The relay server 13 performs the change notification setting using the notification event between the relay server 13 and the relay server 23 with respect to the relay server 23 using the SUBSCRIBE method (step S7). If the account information held by the relay server 23 is changed, the change notification and the account information after the change will be notified from the relay server 23 to the relay server 13 by the NOTIFY method each time. This communication is performed directly without being transmitted via the SIP server 4. Alternatively, the SUBSCRIBE method may be transmitted to the relay server 23 via the SIP server 4.

The content of the local account information LA1 notified from the relay server 23 to the relay server 13 by the NOTIFY method based on the SUBSCRIBE method of step S7 is illustrated in the sequence diagram of FIG. 5.

The local account information LA1 includes information of the communication terminal connected to the LAN 2 in which the relay server 23 is arranged, which communication terminal having performed account registration with respect to the relay server 23. In this case, since the communication terminal 21 had made the account registration with respect to the relay server 23, the account information (SIP:0002@privatesip2) of the communication terminal 21 is recorded in the local account information LA1.

The relay server 13 that has received the local account information LA1 registers the information in its own local account information database 104. The received account information, however, is registered in correspondence to the account information of the relay server, which is the source of the relevant account information. In this case, the account (SIP:0002@privatesip2) of the communication terminal 21 and the account (SIP:relay-server2@sip.srv) of the relay server 23 are registered in correspondence to each other.

The relay server 23 then performs the change notification setting using the notification event between the relay server 23 and the relay server 13 with respect to the relay server 13 using the SUBSCRIBE method (step S8). If the account information held by the relay server 13 is changed, the change notification and the account information after change will be notified from the relay server 13 to the relay server 23 by the NOTIFY method each time. This communication is performed directly without being transmitted via the SIP server 4. Alternatively, the SUBSCRIBE method may be transmitted to the relay server 13 via the SIP server 4.

The content of the local account information LA2 notified from the relay server 13 to the relay server 23 by the NOTIFY method based on the SUBSCRIBE method of step S8 is illustrated in the sequence diagram of FIG. 5. The local account information LA2 includes information of the communication terminal connected to the LAN 1 in which the relay server 13 is arranged, which communication terminal having performed account registration with respect to the relay server 13. The relay server 23 registers the information in its own local account information database 104. In this case, the account (SIP:0001@privatesip1) of the communication terminal 11 and the account (SIP:relay-server1@sip.srv) of the relay server 13 are registered in the local account information database 104 in correspondence to each other.

In this manner, the relay server 13 and the relay server 23 exchange the local account information LA1, LA2, and register the respectively acquired information in the local account information database 104. By accessing the relay server 13, the communication terminal 11 connected to the LAN 1 can reference the local account information database 104 managed by the relay server 13. For instance, the user of the communication terminal 11 can reference the content of the local account information database 104 through the operation of referencing an address book. Similarly, the communication terminal 21 connected to the LAN 2 can reference the local account information database 104 managed by the relay server 23.

A case in which the registered account information is changed by the registration request, movement of the communication terminal, or the like will now be described.

For instance, assume the registration request (REGISTER) is newly transmitted to the relay server 13 by the communication terminal 12 (step S9), as illustrated in FIG. 6. Specifically, the communication terminal 12 makes a registration request of its account (SIP:0003@privatesip1) to the relay server 13. The relay server 13 returns an OK response, whereby the account of the communication terminal 12 and the private IP address of the communication terminal 12 are registered in the local account information database 104 in correspondence to each other. In this case as well, the password authentication may be performed.

Due to the new registration of the account of the communication terminal 12, the account information held by the local account information registering section is changed in the relay server 13. As a result, the local account information including the change notification and the account information after change is notified from the relay server 13 to the relay server 23 by the NOTIFY method based on the change notification (step S8) previously performed with the relay server 23 (step S10).

The content of the local account information LA3 notified from the relay server 13 to the relay server 23 by the NOTIFY method based on the SUBSCRIBE method of step S8 is illustrated in the sequence diagram of FIG. 6. The local account information LA3 includes the information (SIP:0001@privatesip1) of the communication terminal that has performed the account registration with respect to the relay server 13 and the information (SIP:0003@privatesip1) that has newly performed the account registration in correspondence to the account (SIP:relay-server1@sip.srv) of the relay server 13, where the communication terminals are connected to the LAN 1 in which the relay server 13 is arranged.

The relay server 23 registers the received account information in its own local account information database 104, and updates the information after the change.

When the user of the communication terminal 21 needs to perform communication between the communication terminal 12 and the communication terminal 21, the user of the communication terminal 21 then accesses the relay server 23 and references the address book. The user specifies the account of the communication terminal 12 (SIP:0003@privatesip1), and executes the communication process to the communication terminal 12. The SIP command having the destination as the communication terminal 12 is then transmitted from the communication terminal 21 to the relay server 23 (step S11).

When receiving the SIP command having the communication terminal 12 as the destination account, the relay server 23 references the local account information database 104 and specifies the relay server in which the destination account is registered. In this case, the account of the communication terminal 12 is registered in correspondence to the relay server 13, and thus the relay server 13 is selected as a relaying destination.

Accordingly, the relay server 23 directly transfers the SIP command received from the communication terminal 21 to the relay server 13 using the tunneling session (step S11.1). The relay server 13 then transfers the SIP command received from the relay server 23 to the communication terminal 12 (step S11.1.1). The SIP command transmitted from the communication terminal 21 is thereby transferred to the communication terminal 12 through the above-described procedures.

When receiving the SIP command transmitted from the communication terminal 21, the communication terminal 12 returns an SIP response to the communication terminal 21. The response is again directly transferred from the relay server 13 to the relay server 23 using the tunneling session, and then transferred to the communication terminal 21 by the relay server 23.

As described above, when the communication terminal connected to the LAN transmits the registration request (REGISTER) of its account to the relay server, the registered account information is changed, and the information of the relevant registration is automatically shared between the relay servers. The communication terminal then can specify whether to include its own account information to register in the account information to be transmitted to another relay server when making the registration request (REGISTER) to maintain its own presence in a secret state. For instance, when the communication terminal 12 specifies not to include the account information to register in the account information to be transmitted to another relay server in the registration request (REGISTER) in previous step S9, step S10 is not performed. The account of the communication terminal 12 will not be notified to the other relay server.

When the relay server establishes a relay communication session for directly communicating with the other relay server by the INVITE method, whether or not to make a request to transmit the change notification and the account information after the change can be specified when the account information of the opposing relay server is changed. For instance, when the relay server 13 establishes the relay communication session with the relay server 23 in previous step S5, assume a specification is made not to request transmission of the notification change and the account information after the change when the account information of the opposing relay server is changed. In this case, the SUBSCRIBE method of step S7 is not transmitted. Alternatively, the SUBSCRIBE method in which the valid duration is very short is transmitted, and notification by the NOTIFY method from the relay server 23 based thereon is performed only once, where change notification and the like is not transmitted even if a change is made thereafter.

In addition, the communication terminal can decide whether to expose its presence by adding attribute information (e.g., PUBLIC/PRIVATE) to the registration request command when making the registration request (REGISTER) to the relay server. The communication terminal can expose its presence only to a specific relay server (e.g., PRIVATE=relay server 23 and the like) by adding the attribute information.

In the above example, a case in which the account information of the communication terminal is newly registered has been described as a case in which the account information is changed, but obviously, there may be a case in which the registered account information of the communication terminal is deleted.

As described above, the communication terminal connected to the LAN 1, LAN 2 can communicate with the communication terminal connected to another LAN 1, 2 via the Internet 3 by using the communication system of the present preferred embodiment.

Since the relay servers establish the communication path automatically and in real time, dynamic response is achieved even if the communication terminal moves and the like between the LANs.

Each communication terminal can have its presence maintained in a secret state when registered in the relay server, as necessary. Furthermore, specification may be made not to dynamically respond when establishing a relay path.

Second Preferred Embodiment

Figure 7:
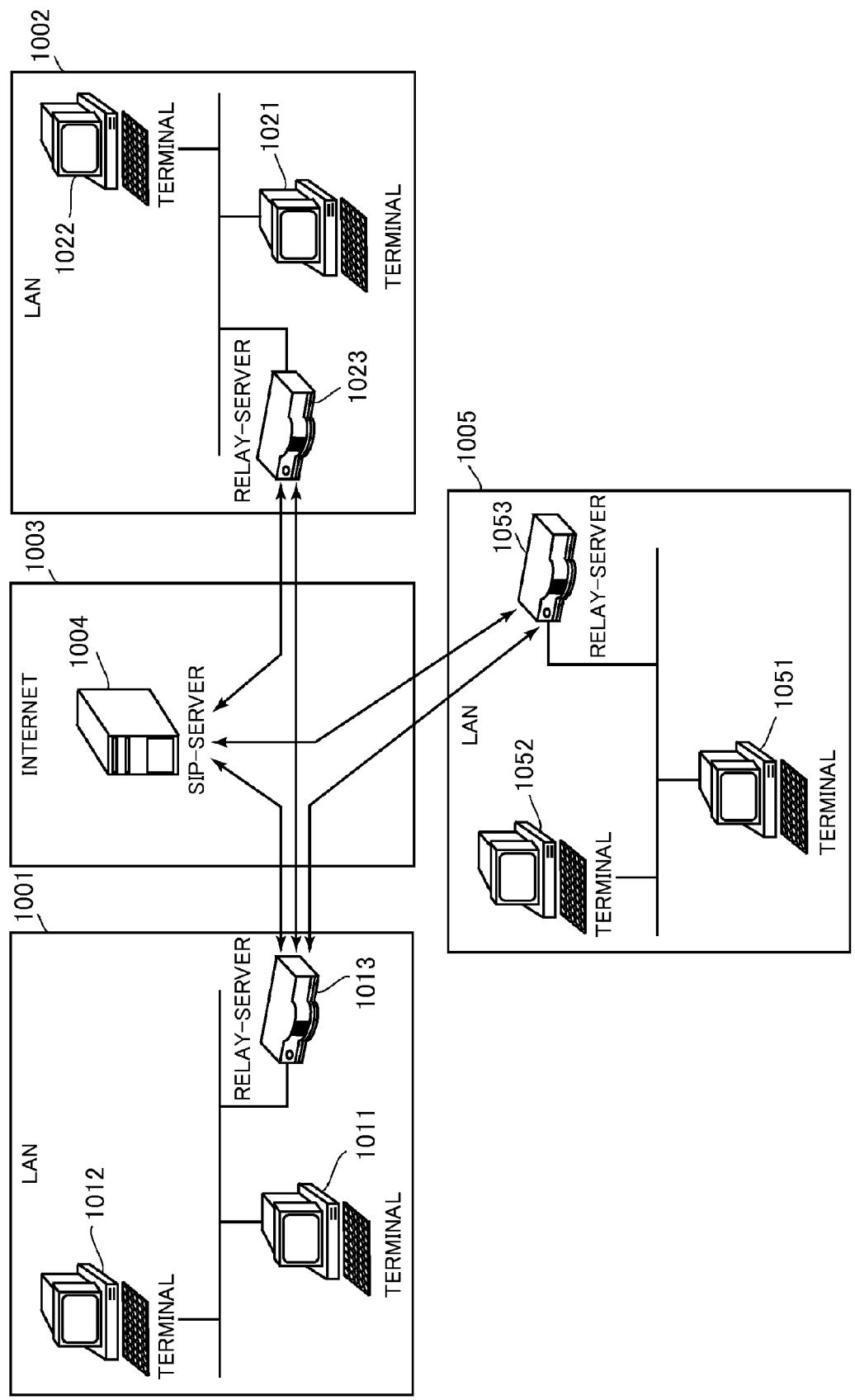
FIG. 7 is a network configuration view of a communication system according to a second preferred embodiment of the present invention.

A second preferred embodiment of the present invention will now be described with reference to the drawings. FIG. 7 is an overall view of a communication system according to the present preferred embodiment. The communication system preferably includes an Internet 1003, and three LANs 1001, 1002, and 1005 connected to an Internet 1003. The LANs 1001, 1002, and 1005 are networks at physically remote locations. For example, the LAN 1001 is a local network in a central office building, whereas the LANs 1002 and 1005 are local networks respectively provided in other branch office buildings, where the three LAN 1001, 1002, and 1005 are respectively connected to the Internet 1003, which is a global network.

As illustrated in the figure, communication terminals 1011, 1012 are connected to the LAN 1001. The communication terminals 1011, 1012 are respectively given a private IP address. Generally, a private IP address managed uniquely only in the LAN is given to the terminal connected to the LAN. The LAN 1001 is connected with a relay server 1013. The relay server 1013 is connected to the LAN 1001 and is also connected to the Internet 1003. A LAN interface private IP address and a WAN interface global IP address are given to the relay server 1013.

Communication terminals 1021, 1022 given a private IP address are connected to the LAN 1002. The LAN 1002 is connected with a relay server 1023. The relay server 1023 is connected to the LAN 1002 and is also connected to the Internet 1003, and is given an LAN interface private IP address and a WAN interface global IP address.

Similarly, communication terminals 1051, 1052 given a private IP address are connected to the LAN 1005. The LAN 1005 is connected with a relay server 1053. The relay server 1053 is connected to the LAN 1005 and is also connected to the Internet 1003, and is given an LAN interface private IP address and a WAN interface global IP address.

An SIP server 1004 is connected to the Internet 1003. The SIP server 1004 functions as a proxy server for relaying the SIP method and response, and functions as a SIP register server for registering the account of the relay servers 1013, 1023, and 1053 when the relay servers 1013, 1023, and 1053 perform the communication using the SIP (Session Initiation Protocol).

The relay server 1013 connected to the LAN 1001 functions as a SIP register server for registering the accounts of the communication terminals 1011, 1012, and the like connected to the LAN 1001 using the SIP.

Figure 8:
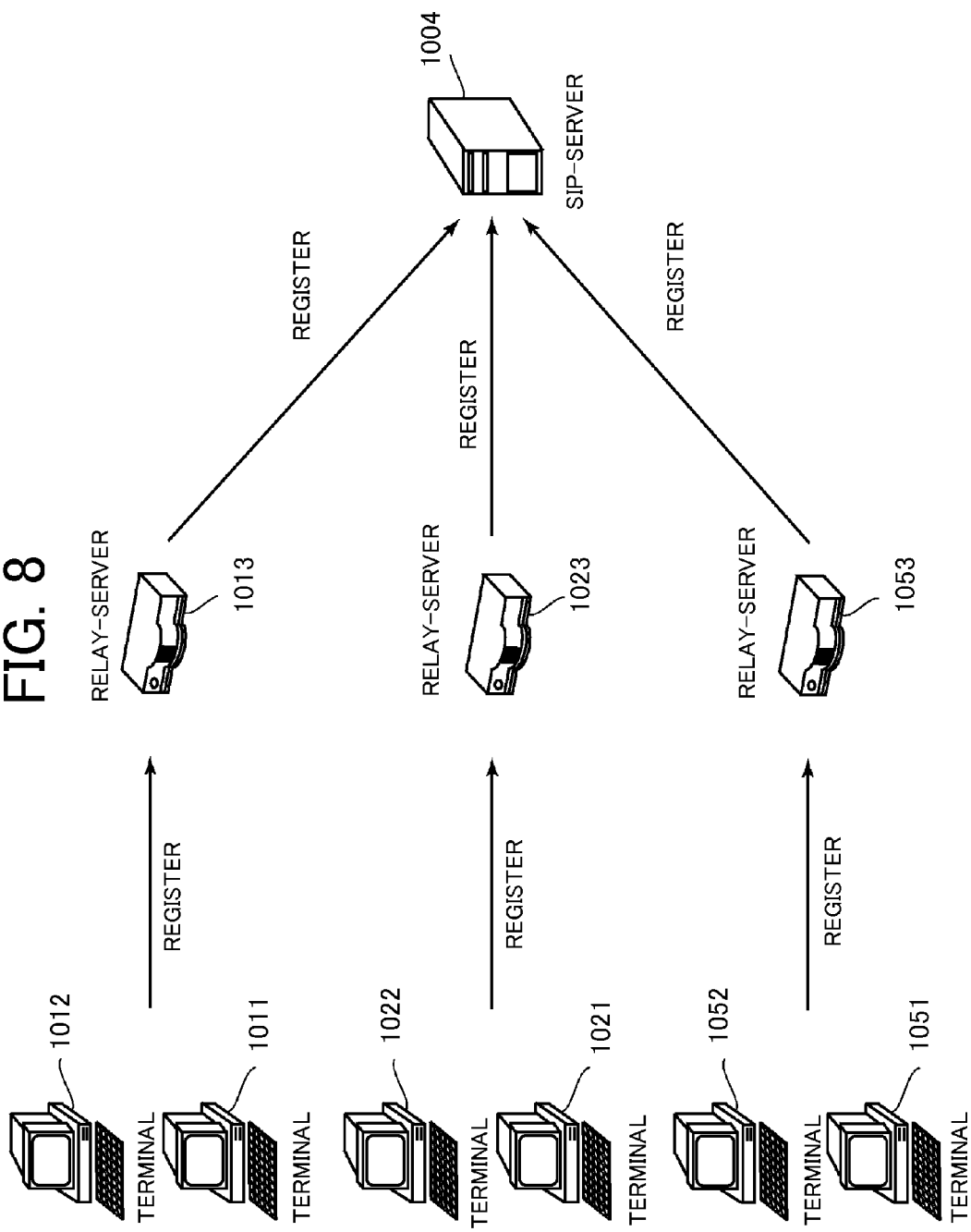
FIG. 8 is a view showing a relationship of communication terminals and relay servers, and a relationship between the relay servers and a SIP server.

That is, as illustrated in FIG. 8, the relay server 1013 functions as the SIP register server to register the account based on a registration request (REGISTER) received from the communication terminals 1011, 1012 in relation with the communication terminals 1011, 1012, and functions as a client to transmit the registration request (REGISTER) of the account to the SIP server 1004 in relation with the SIP server 1004.

Similarly, each relay server 1023, 1053 connected to the LANs 1002 and 1005 functions as a SIP register server to register the accounts of the communication terminals 1021, 1022 and the like, and 1051, 1052 and the like connected to the LANs 1002, 1005 using the SIP.

That is, as illustrated in FIG. 8, the relay servers 1023, 1053 function as the SIP register server for registering the account based on the registration request (REGISTER) received from the communication terminals 1021, 1022, 1051, 1052 in relation with the communication terminals 1021, 1022, 1051, 1052, and function as a client for transmitting the registration request (REGISTER) of the account to the SIP server 1004 in relation with the SIP server 1004.

Figure 9:
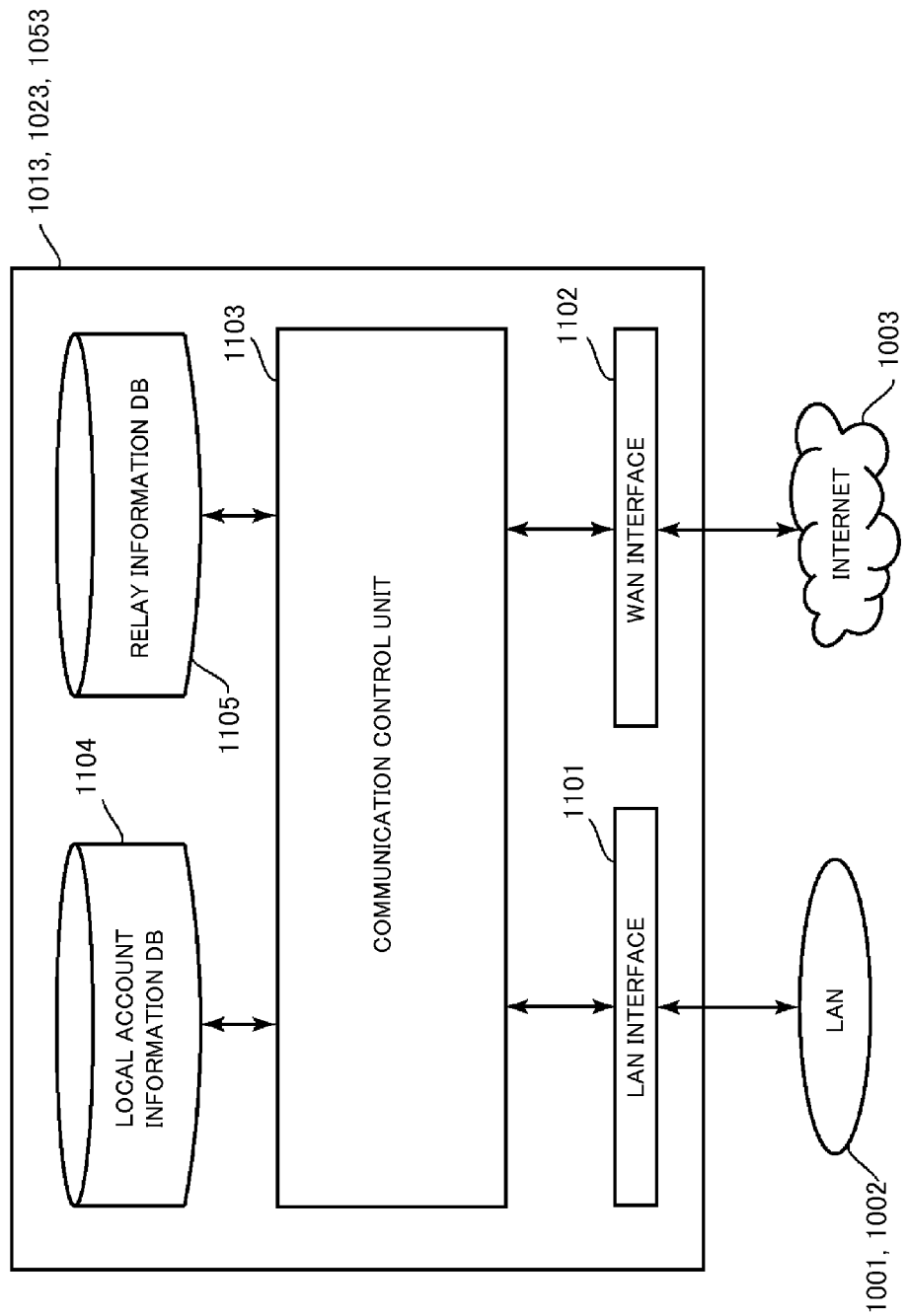
FIG. 9 is a functional block diagram of the relay server.

FIG. 9 is a functional block diagram of the relay servers 1013, 1023, and 1053. The relay servers 1013, 1023, and 1053 preferably have a similar function, and thus will be described using the same figure. The relay servers 1013, 1023, and 1053 preferably include a LAN interface 1101, a WAN interface 1102, a communication control unit 1103, a local account information database 1104, and a relay information database 1105.

The LAN interface 1101 is an interface that performs communication with the communication terminal connected to the LAN using the private IP address. That is, the relay server 1013 performs communication with the communication terminals 1011, 1012, and the like using the LAN interface 1101, the relay server 1023 performs communication with the communication terminals 1021, 1022, and the like using the LAN interface 1101, and the relay server 1053 performs communication with the communication terminals 1051, 1052, and the like using the LAN interface 1101.

The WAN interface 1102 is an interface that performs communication with the SIP server 1004 connected to the Internet 1003, which is the global network, and other communication servers connected to the Internet 1003 and communication terminals using the global IP address. In the present preferred embodiment, the relay server preferably is configured with the WAN interface, but a connection to the WAN may be performed by a router and the relay server may be arranged to serve therebelow.

The communication control unit 1103 preferably is a processing unit for controlling various communications performed through the LAN interface 1101 and the WAN interface 1102. The communication control unit 1103 controls various communication processes according to protocols such as TCP/IP, UDP, SIP or the like.

One function of the communication control unit 1103 is to receive the registration request (REGISTER) of the account from the communication terminal connected to the LAN, and to register the account information of the communication terminal in the local account information database 1104. For example, the relay server 1013 receives the registration request (REGISTER) of the account from the communication terminal 1011 and registers the account information of the communication terminal 1011 in the local account information database 1104.

The communication control unit 1103 executes the process of exchanging account information with another relay server, transmitting its own account information to the relay server thereof, receiving the account information held by the relevant relay server, and registering the information in its own local account information database 1104. When the account information held by the relay server is changed, a change notification setting of requesting to continuously transmit change notification and account information after change is performed on another relay server, where a process of transmitting the change notification and the account information after change to the relay server in which the change notification setting is performed is executed when its own account information is changed. This process is performed using a notification event by the methods of SUBSCRIBE and NOTIFY in the SIP as hereinafter described. The period of executing the notification event is set in the notification event. The change notification setting using the notification event is performed by transmitting the SUBSCRIBE method through operator control and the like. Subsequently, if the account information of the relay server on the side receiving the SUBSCRIBE method is changed thereafter during the period the notification event can be executed, the change notification and the notification of the new account information are provided every time to the relay server on the side transmitting the SUBSCRIBE method by the NOTIFY method.

The notifying account information is registered in the local account information database 1104. If a change is made, the content after the change is registered every time, and continuously updated.

The communication control unit 1103 executes the process of exchanging relay information including relay path information of the relay communication session established with another relay server, transmitting its own relay information to the relay server thereof, receiving the relay information held by the relevant relay server, and registering the information in its own relay information database 1105. When the relay information held by the relay server is changed, the change notification setting for requesting to continuously transmit change notification and relay information after the change is performed on another relay server, where a process of transmitting the change notification and the relay information after the change to the relay server in which the change notification setting is performed is executed when its own relay information is changed. The processes are performed using a notification event by the methods of SUBSCRIBE and NOTIFY, similar to the previous account information. The period of executing the notification event can be set in the notification event. The change notification setting using the notification event is performed by transmitting the SUBSCRIBE method through operator operation and the like. Subsequently, if the relay information of the relay server on the side receiving the SUBSCRIBE method is changed thereafter during the period the notification event can be executed, the change notification and the notification of the new relay information are provided every time to the relay server on the side transmitting the SUBSCRIBE method by the NOTIFY method.

The notifying relay information is registered in the relay information database 1105. If a change is made, the content after the change is registered every time, and continuously updated.

When establishing a relay communication session that is directly communicable with another relay server by the INVITE method, whether or not to request for transmission of the change notification and the relay information after the change can be specified in the case where the relay information of the opposing relay server is changed. When specifying not to request for change notification, the change notification setting by the SUBSCRIBE method is not performed, or even if the change notification setting is performed by the SUBSCRIBE method, notification by the NOTIFY method is performed only once and the change notification or the like will not be transmitted thereafter even if the change is made. That is, the change notification of the relay information can be selected whether or not it is to be requested to the opposing relay server. For instance, notification by NOTIFY will only be received once from the opponent if the execution period of the notification event in the SUBSCRIBE method is set to a very small value.

Similarly, when establishing the relay communication session that is directly communicable with another relay server by the INVITE method, whether or not to include the relay path information formed by the communication session in the relay information can be specified. That is, the relay server can hold the relay communication session to be newly established in a secret state by specifying not to include the relay path information in the relay information.

Furthermore, when receiving the communication request specifying the account of the communication terminal in another LAN from the communication terminal in the same LAN, the communication control unit 1103 determines the relay server in which the account specified from the account information received from another relay server is registered, and detects whether or not a directly communicable relay communication session is established between the communication control unit 1103 and the corresponding relay server. If the directly communicable relay communication session is not established, a control is performed to determine the relay path from the exchanged relay information, and relay the communication data between the communication terminal indirectly through the relay communication session with the relay server on the relay path.

The communication control unit 1103 has a function of transmitting the registration request (REGISTER) for performing account registration of the relay server itself to the SIP server 1004.

The communication control unit 1103 also has a function of connecting and maintaining a tunneling session between the relay servers 1013, 1023, and 1053 on the opposing side. That is, the relay servers 1013, 1023, and 1053 transmits the INVITE method of SIP from any one server to establish the tunneling session between the relay servers 1013, 1023, and 1053. The communication control units 1103 of the relay servers 1013, 1023, and 1053 maintain the established tunneling session to relay the communication data between the communication terminals connected to the LANs 1001, 1002, and 1005.

In other words, since a private account is given to the communication terminals connected to the LANs 1001, 1002, and 1005, the private account of the destination is specified when communicating with the communication terminal arranged in a different LAN 1001, 1002, and 1005 from each other. However, the communication data such as the SIP command in which the private account is specified is encapsulated between the relay servers 1013, 1023, and 1053 and relayed to the other relay servers 1013, 1023, and 1053. The relay servers 1013, 1023, and 1053 on the receiving side retrieves the relayed SIP command and relays and transmits the communication data specifying the private account to the corresponding communication terminal.

Figure 10:
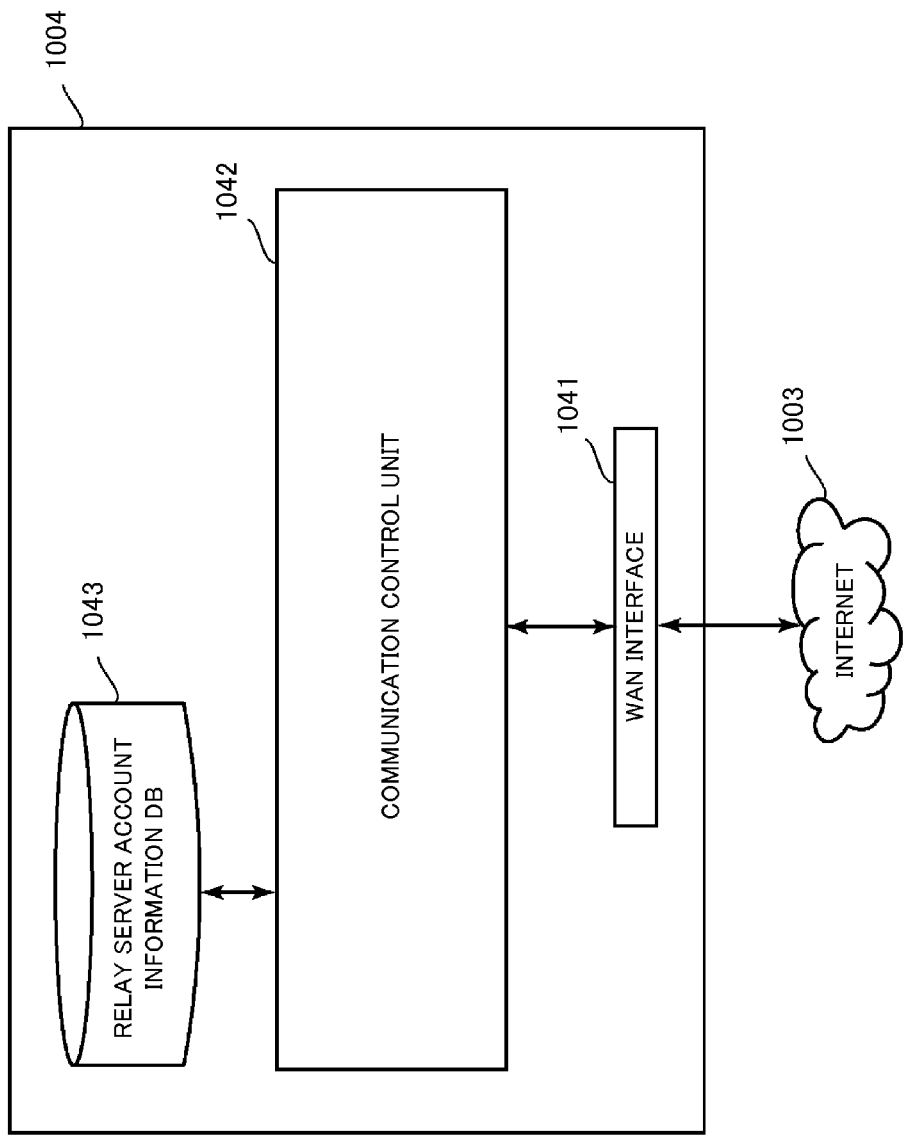
FIG. 10 is a functional block diagram of the SIP server.

FIG. 10 is a functional block diagram of the SIP server 1004. As illustrated in the figure, the SIP server 1004 preferably includes a WAN interface 1041, a communication control unit 1042, and a relay server account information database 1043.

The WAN interface 1041 is an interface that performs communication with the server connected to the Internet 1003 or the terminal using the global IP address. The SIP server 1004 can communicate with the relay servers 1013, 1023, and 1053 using the WAN interface 1041.

The communication control unit 1042 preferably is a processing unit for controlling various communications performed through the WAN interface 1041. The communication control unit 1042 controls the communication processes according to protocols such as TCP/IP, UDP, SIP, or the like.

One function of the communication control unit 1042 is to receive the registration request (REGISTER) of the account from the relay server connected to the Internet 1003, and to register the account information of the relay server in the relay server account information database 1043. For instance, the SIP server 1004 receives the registration request (REGISTER) of the account from the relay server 1013, and registers the account information of the relay server 1013 in the relay server account information database 1043.

The communication control unit 1042 also has a function of relaying communication data such as various SIP methods and responses transmitted from the relay servers 1013, 1023, and 1053 to the other relay server.

Figure 11:
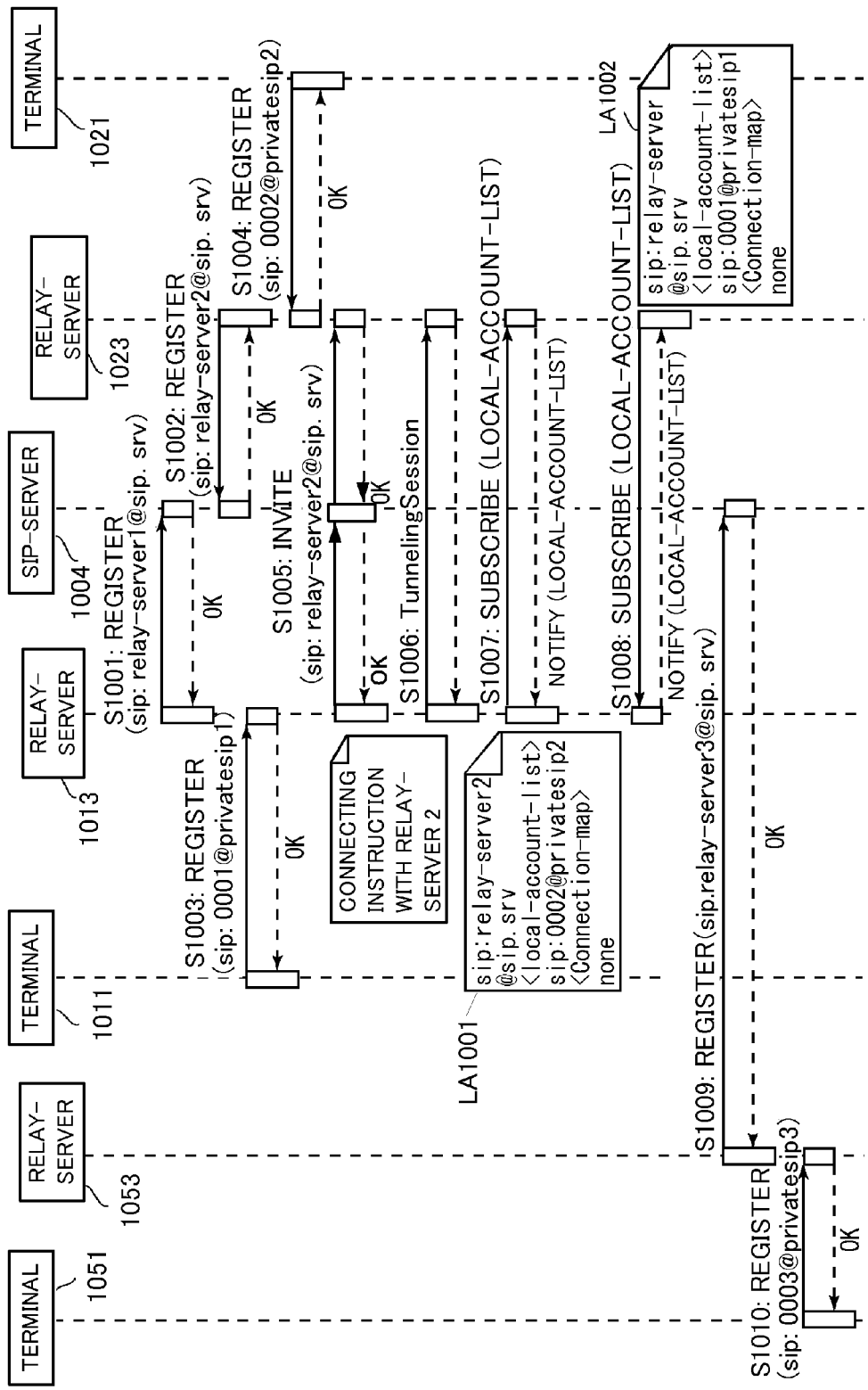
FIG. 11 is a sequence diagram of a communication process.
Figure 12:
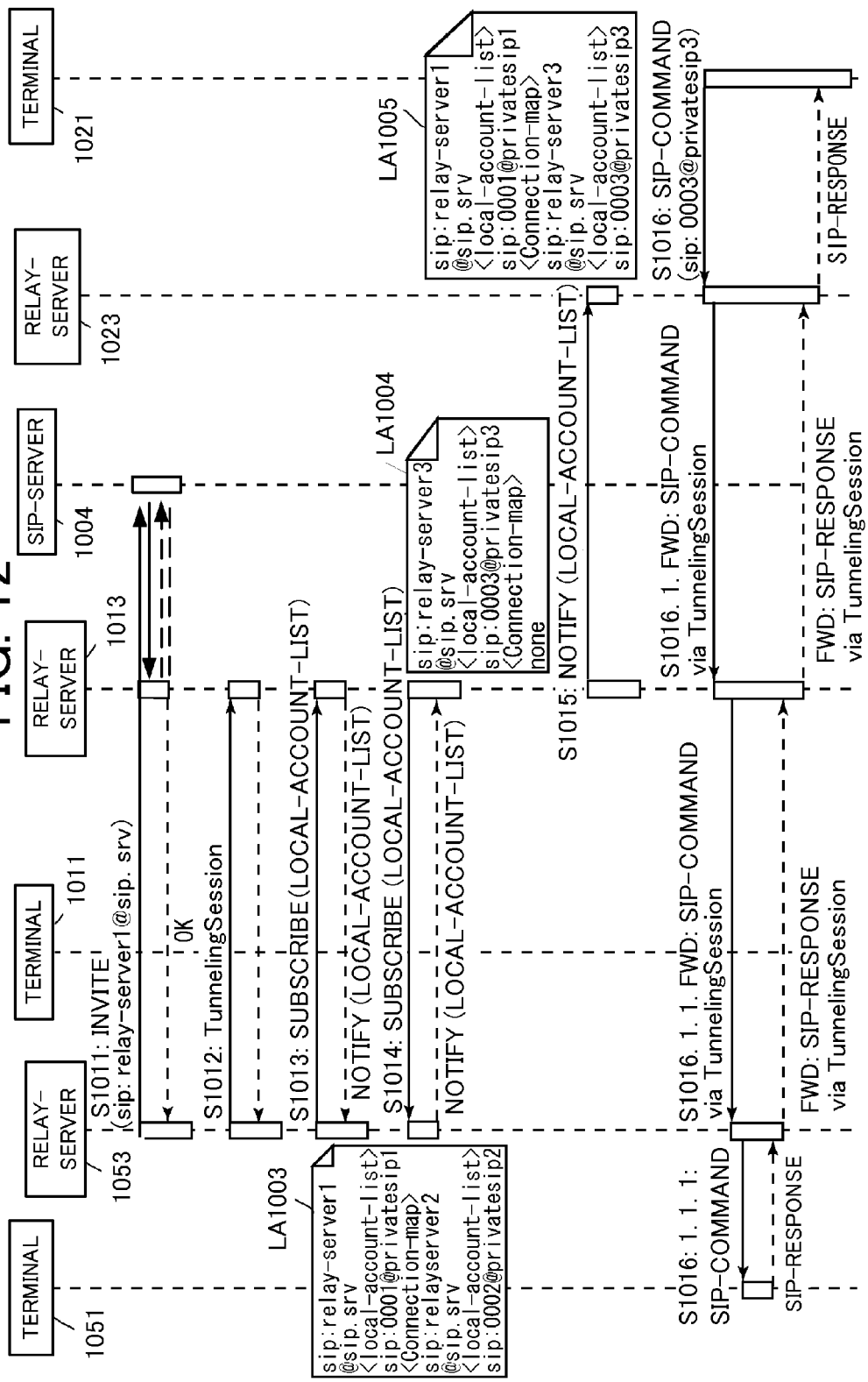
FIG. 12 is a sequence diagram of the communication process.

The flow of communication processes in the communication system configured as above will now be described with reference to the processing sequence diagrams of FIGS. 11 and 12. FIG. 11 shows a sequence from step S1001 to step S1010, and FIG. 12 shows a sequence from step S1011 to step S1016.

As illustrated in FIG. 7, the relay communication session is directly established between the relay server 1013 and the relay server 1023, and a relay communication session is directly established between the relay server 1013 and the relay server 1053. The flow of communication processes until the communication data between the communication terminal 1021 in the LAN 1002 and the communication terminal 1051 in the LAN 1005 is indirectly relayed through the relay path from the relay server 1023 through the relay server 1013 to the relay server 1053 is illustrated. This will be described in detail below.

First, the relay server 1013 transmits the registration request (REGISTER) of the account to the SIP server 1004 (step S1001). As illustrated in FIG. 11, the relay server 1013 makes a registration request of its account (SIP: relay-server1@sip.srv). The SIP server 1004 returns an OK response to the relay server 1013, whereby the account of the relay server 1013 and the global IP address of the relay server 1013 are registered in the relay server account information database 1043 in correspondence to each other. When performing a password authentication, the account of the relay server and a password are registered in the relay server account information database 1043 in advance in correspondence to each other. In this case, the user transmits the password with the registration request. If password authentication is successful, the account is registered in correspondence to the IP address.

Subsequently, the relay server 1023 transmits the registration request (REGISTER) to the SIP server 1004 (step S1002). The relay server 1023 makes the registration request of its account (SIP: relay-server2@sip.srv). The SIP server 1004 returns an OK response to the relay server 1023, whereby the account of the relay server 1023 and the global IP address of the relay server 1023 are registered in the relay server account information database 1043 in correspondence to each other. Similarly, the password authentication may be performed.

The communication terminal 1011 then transmits the registration request (REGISTER) of the account to the relay server 1013 (step S1003). The communication terminal 1011 makes a registration request of its account (SIP: 0001@privatesip1). The relay server 1013 returns an OK response, whereby the account of the communication terminal 1011 and the private IP address of the communication terminal 1011 are registered in the local account information database 1104 in correspondence to each other. When performing a password authentication, the account of the communication terminal and a password are registered in the local account information database 1104 in advance in correspondence to each other. In this case, the user transmits the password with the registration request. If password authentication is successful, the account is registered in correspondence to the IP address.

The communication terminal 1021 then transmits the registration request (REGISTER) of the account to the relay server 1023 (step S1004). The communication terminal 1021 makes a registration request of its account (SIP:0002@privatesip2). The relay server 1023 returns an OK response, whereby the account of the communication terminal 1021 and the private IP address of the communication terminal 1021 are registered in the local account information database 1104 in correspondence to each other. In this case as well, password authentication may be performed.

Accordingly, the account registration of the relay servers 1013, 1023 with respect to the SIP server 1004 is completed, and the account registration of the communication terminals 1011, 1021 with respect to the relay servers 1013, 1023 is completed.

The relay server 1013 transmits a connection request command (INVITE method) with respect to the relay server 1023 to the SIP server 1004 (step S1005). The account (SIP:relay-server2@sip.srv) of the relay server 1023 of connection request destination is specified in the INVITE method. The SIP server 1004 references the relay server account information 1043 to acquire the global IP address of the relay server 1023. The SIP server 1004 then relays the INVITE message transmitted from the relay server 1013 to the relay server 1023.

When the connection request command is transmitted from the relay server 1013 to the relay server 1023, an OK response is transferred from the relay server 1023 to the relay server 1013 via the SIP server 1004. Thus, if the connection request command is accepted in such a manner, a tunneling session is established between the relay servers 1013, 1023 (step S1006).

The processes from step S1001 to S1006 are generally performed as an initial setting of the network by the operator. The operator performs the operation of registering in the SIP server 1004 the relay server arranged in the LAN the operator desires to connect to via the Internet 1003. The operator also performs the operation of registering in the relay server, the communication terminal to which the operator desires to communicate to via the Internet 1003.

The relay server 1013 performs the change notification setting using the notification event between the relay server 1013 and the relay server 1023 with respect to the relay server 1023 using the SUBSCRIBE method (step S1007). Accordingly, if the account information or the relay information held by the relay server 1023 is changed, the change notification and the account information after the change or the relay information after the change will be notified from the relay server 1023 to the relay server 1013 by the NOTIFY method each time. Since both information is contained in the local account information LA, the local account information after change then merely needs to be collectively notified. This communication is performed directly without being transmitted via the SIP server 1004. Alternatively, the SUBSCRIBE method may be transmitted to the relay server 1023 via the SIP server 1004.

The content of the local account information LA1001 notified from the relay server 1023 to the relay server 1013 by the NOTIFY method based on the SUBSCRIBE method of step S1007 is illustrated in the sequence diagram of FIG. 11.

The local account information LA1001 includes information of the communication terminal connected to the LAN 1002 in which the relay server 1023 is arranged, which communication terminal having performed account registration with respect to the relay server 1023. In this case, since the communication terminal 1021 had made the account registration with respect to the relay server 1023, the account information (SIP:0002@privatesip2) of the communication terminal 1021 is recorded in the local account information LA1001.

The relay server 1013 that has received the local account information LA1001 registers the information in its own local account information database 1104. The received account information, however, is registered in correspondence to the account information of the relay server, which is the source of the relevant account information. In this case, the account (SIP:0002@privatesip2) of the communication terminal 1021 is registered in correspondence to the account (SIP: relay-server2@sip.srv) of the relay server 1023.

The local account information LA1001 includes relay information containing the relay path information of the directly communicable communication session established by the relay server 1023. However, since the relay server 1023 has not yet established the directly communicable communication session other than with the relay server 1013, the fact that the relay path information contained in the relay information is not present (none) is recorded. The relay server 1013 that has received the local account information LA1001 registers the information in its own relay information database 1105 in correspondence to the account information (SIP: relay-server2@sip.srv) of the relay server 1023, which is the source of the relevant relay information.

The relay server 1023 then performs the change notification setting using the notification event between the relay server 1023 and the relay server 1013 with respect to the relay server 1013 using the SUBSCRIBE method (step S1008). Thus, if the account information or the relay information held by the relay server 1013 is changed, the change notification and the account information or the relay information after change will be notified from the relay server 1013 to the relay server 1023 by the NOTIFY method each time. This communication is performed directly without being transmitted via the SIP server 1004. Alternatively, the SUBSCRIBE method may be transmitted to the relay server 1013 via the SIP server 1004.

The content of the local account information LA1002 notified from the relay server 1013 to the relay server 1023 by the NOTIFY method based on the SUBSCRIBE method of step S1008 is illustrated in the sequence diagram of FIG. 11. The local account information LA1002 includes information of the communication terminal connected to the LAN 1001 in which the relay server 1013 is arranged, which communication terminal having performed account registration with respect to the relay server 1013. The relay server 1023 registers the information in its own local account information database 1104. In this case, the account (SIP:0001@privatesip1) of the communication terminal 1011 and the account (SIP: relay-server1@sip.srv) of the relay server 1013 are registered in the local account information database 1104 in correspondence to each other.

The local account information LA1002 includes relay information containing the relay path information of the directly communicable communication session established by the relay server 1013. However, since the relay server 1013 has not yet established the directly communicable communication session other than with the relay server 1023, the fact that the relay path information contained in the relay information is not present (none) is recorded. The relay server 1023 that has received the local account information LA1002 registers the information in its own relay information database 1105 in correspondence to the account information (SIP: relay-server1@sip.srv) of the relay server 1013, which is the source of the relevant relay information.

In this manner, the relay server 1013 and the relay server 1023 exchange the local account information LA1001, LA1002, and register the respectively acquired information in the local account information database 1104 and the relay information database 1105. By accessing the relay server 1013, the communication terminal 1011 connected to the LAN 1001 can reference the local account information database 1104 managed by the relay server 1013. For instance, the user of the communication terminal 1011 can reference the content of the local account information database1 1104 through the operation of referencing an address book. Similarly, the communication terminal 1021 connected to the LAN 1002 can reference the local account information database 1104 managed by the relay server 1023.

The relay communication session is thus directly established between the relay server 1013 and the relay server

1023. The flow of communication process for establishing the relay communication session directly between the relay server 1013 and the relay server 1053 will now be described.

The relay server 1053 transmits the registration request (REGISTER) of the account to the SIP server 1004 (step S1009). The relay server 1053 makes a registration request of its account (SIP: relay-server3@sip.srv). The SIP server 1004 returns an OK response to the relay server 1053, whereby the account of the relay server 1013 and the global IP address of the relay server 1013 are registered in the relay server account information database 1043 in correspondence to each other. Similarly, the password authentication may be performed.

The communication terminal 1051 then transmits the registration request (REGISTER) of the account to the relay server 1053 (step S1010). The relay server 1053 registers the account (SIP: 0003@privatesip3) of the communication terminal 1051 and the private IP address of the communication terminal 1051 in the local account information database 1104 in correspondence to each other.

As illustrated in FIG. 12, the relay server 1053 transmits a connection request command (INVITE method) with respect to the relay server 1013 to the SIP server 1004 (step S1011). The account (SIP:relay-server1@sip.srv) of the relay server 1013 of connection request destination is specified in the INVITE method. The SIP server 1004 references the relay server account information 1043 to acquire the global IP address of the relay server 1013. The SIP server 1004 then relays the INVITE message transmitted from the relay server 1053 to the relay server 1013.

As described above, when the connection request command is transmitted from the relay server 1053 to the relay server 1013, an OK response is transferred from the relay server 1013 to the relay server 1053 via the SIP server 1004. If the connection request command is accepted in such a manner, a tunneling session is established between the relay servers 1053, 1013 (step S1012). Note that the processes from step S1009 to S1012 are generally performed as an initial setting of the network by the operator, similar to the previous steps S1001 to S1006.

The relay server 1053 then performs the change notification setting using the notification event with the relay server 1013 with respect to the relay server 1013 using the SUBSCRIBE method (step S1013). If the account information or the relay information contained in the local account information held by the relay server 1013 is changed, the change notification and the local account information after the change will be notified from the relay server 1013 to the relay server 1053 by the NOTIFY method each time. This communication is performed directly without being transmitted via the SIP server 1004. Alternatively, the SUBSCRIBE method may be transmitted to the relay server 1013 via the SIP server 1004.

The content of the local account information LA1003 notified from the relay server 1013 to the relay server 1053 by the NOTIFY method based on the SUBSCRIBE method of step S1013 is illustrated in the sequence diagram of FIG. 12. The local account information LA1003 includes information of the communication terminal connected to the LAN 1001 in which the relay server 1013 is arranged, which communication terminal having performed account registration with respect to the relay server 1013. In this case, since the communication terminal 1011 had made account registration with respect to the relay server 1013, the account information (SIP:0001@privatesip1) of the communication terminal 1011 is recorded in the local account information LA1003.

The relay server 1013 establishes a communication session that is directly communicable with the relay server 1023, and thus relay path information (SIP: relay-server2@sip.srv) indicating that the directly communicable communication session is established with the relay server 1023 is recorded in the relay information. The relay path information is also recorded with the account information (SIP: 0002@privatesip2) of the communication terminal 1021 connected to the LAN 1002 in which the relay server 1023 is arranged, which communication terminal having performed account registration with respect to the relay server 1023.

The relay server 1053 that has received the local account information LA1003 registers the received account information in its own local account information database 1104. The received account information, however, is registered in correspondence to the account information of the relay server, which is the source of the relevant account information. In this case, the account (SIP:0001@privatesip1) of the communication terminal 1011 is registered in correspondence to the account (SIP:relay-server1@sip.srv) of the relay server 1013.

The relay server 1053 registers the received relay information in its own relay information database 1105. In this case, the relay path information (SIP: relay-server2@sip.srv) is registered with the account information (SIP: 0002@privatesip2) of the communication terminal 1021 under the management of the relay server 1023 in correspondence to the account (SIP: relay-server1@sip.srv) of the relay server 1013.

The relay server 1013 then performs the change notification setting using the notification event between the relay server 1013 and the relay server 1053 with respect to the relay server 1053 using the SUBSCRIBE method (step S1014). Thus, if the account information or the relay information contained in the local account information held by the relay server 1053 is changed, the change notification and the local account information after the change will be notified from the relay server 1053 to the relay server 1013 by the NOTIFY method each time. This communication is performed directly without being transmitted via the SIP server 1004. Alternatively, the SUBSCRIBE method may be transmitted to the relay server 1053 via the SIP server 1004.

The content of the local account information LA1004 notified from the relay server 1053 to the relay server 1013 by the NOTIFY method based on the SUBSCRIBE method of step S1014 is illustrated in the sequence diagram of FIG. 12. The local account information LA1004 includes information of the communication terminal connected to the LAN 1005 in which the relay server 1053 is arranged, which communication terminal having performed account registration with respect to the relay server 1053. The relay server 1013 registers the received account information in its own local account information database 1104. In this case, the account (SIP: 0003@privatesip3) of the communication terminal 1051 and the account (SIP: relay-server3@sip.srv) of the relay server 1053 are registered in the local account information database 1104 in correspondence to each other.

The local account information LA1004 includes relay information containing the relay path information of the directly communicable communication session established by the relay server 1053. However, since the relay server 1053 has not yet established the directly communicable communication session other than with the relay server 1013, the fact that the relay path information contained in the relay information is not present (none) is recorded. The relay server 1013 that has received the local account information LA1004 registers the information in its own relay information database 1105 in correspondence to the account information (SIP: relay-server3@sip.srv) of the relay server 1053, which is the source of the relevant relay information.

In this manner, the relay server 1053 and the relay server 1013 exchange the local account information LA1003, LA1004, and register the respectively acquired information in the local account information database 1104 and the relay information database 1105.

In the relay server 1013, the relay information changes since the directly communicable relay communication session is established with the relay server 1053. As a result, the local account information including the change notification and the relay information after change is notified from the relay server 1013 to the relay server 1023 by the NOTIFY method based on the change notification setting (step S1008) previously carried out with the relay server 1023 (step S1015).

The content of the local account information LA1005 notified from the relay server 1013 to the relay server 1023 by the NOTIFY method based on the SUBSCRIBE method of step S1008 is illustrated in the sequence diagram of FIG. 12. The local account information LA1005 includes the information (SIP:0001@privatesip1) of the communication terminal that has performed the account registration with respect to the relay server 1013 in correspondence to the account (SIP: relay-server1@sip.srv) of the relay server 1013, where the communication terminal is connected to the LAN 1001 in which the relay server 1013 is arranged. The relay path information (SIP: relay-server3@sip.srv) indicating that a new directly communicable communication session is established with the relay server 1053 is recorded as the relay information in correspondence to the account information (SIP: 0003@privatesip3) of the communication terminal 1051 under the management of the relay server 1053.

The relay server 1023 registers the received account information in its own local account information database 1104 in correspondence to the account information (SIP: relay-server1@sip.srv) of the relay server 1013, registers the received relay information in its own relay information database 1105, and updates the information after change.

The flow of communication process until the communication data between the communication terminal 1021 in the LAN 1002 and the communication terminal 1051 in the LAN 1005 is indirectly relayed through the relay path from the relay server 1023 through the relay server 1013 to the relay server 1053 will now be described.

The user of the communication terminal 1021 accesses the relay server 1023 and references the address book. The user specifies the account of the communication terminal 1051 (SIP: 0003@privatesip3), and executes the communication process on the communication terminal 1051. The SIP command having the destination as the communication terminal 1051 is then transmitted from the communication terminal 1021 to the relay server 1023 (step S1016).

When receiving the SIP command having the communication terminal 1051 as the destination account, the relay server 1023 references the local account information database 1104 and specifies the relay server in which the destination account is registered. In this case, the account of the communication terminal 1051 is registered in correspondence to the relay server 1053, and thus the relay server 1053 is selected as the relaying destination.

Whether or not the directly communicable relay communication session is established with the relay server 1053 is detected. The directly communicable relay communication session is not established between the relay server 1023 and the relay server 1053. The relay server 1023 thus references the relay information database 1105 and determines the relay path from the exchanged relay information.

Specifically, the relay information held in its own relay information database 1105 is recorded with the fact that the relay server 1013 having established the relay communication session with the relay server 1023 has established the relay communication session with the relay server 1053 (see local account information LA1005). Therefore, the indirect relay path with the relay server 1053 via the relay server 1013 can be determined with reference thereto.

When the relay path is determined, the relay server 1023 directly transfers the SIP command received from the communication terminal 1021 to the relay server 1013 using the tunneling session (step S1016.1). The relay server 1013 then directly transfers the SIP command received from the relay server 1023 to the communication terminal 1053 (step S1016.1.1). The SIP command is transferred from the relay server 1053 to the communication terminal 1051 (step S1016.1.1.1). The SIP command transmitted from the communication terminal 1021 is thereby transferred to the communication terminal 1051 through the above-described procedures.

When receiving the SIP command transmitted from the communication terminal 1021, the communication terminal 1051 returns the SIP response to the communication terminal 1021. The response is again transferred from the relay server 1053 to the relay server 1023 via the relay server 1013 using the tunneling session, and then transferred to the communication terminal 1021 by the relay server 1023.

When establishing a relay communication session that is directly communicable with the other relay server by the INVITE method, whether or not to make a request to transmit the change notification and the relay information after the change can be specified when the account information of the opposing relay server is changed. For instance, when the relay server 1053 establishes the relay communication session with the relay server 1013 in previous step S1011, the specification is made not to request for transmission of the notification change and the relay information after the change when the relay information of the opposing relay server is changed. In this case, SUBSCRIBE method of step S1013 is not transmitted and the change notification setting is not performed. Alternatively, the SUBSCRIBE method in which the valid duration is very short is transmitted, and notification by the NOTIFY method based thereon is performed only once, where change notification or the like is not transmitted even if the change is made thereafter.

In addition, when establishing a relay communication session for directly communicating with the other relay server by the INVITE method, whether or not to include the relay path information formed by the relevant communication session in the relay information can be specified. For instance, when the relay server 1053 establishes the relay communication session with the relay server 1013 in previous step S1011, the specification is made not to include the generated relay path information in the relay information, in which case, the relay path information (SIP: relay-server3@sip.srv) is not contained in the local account information LA1005 in step S1015 along with the account information (SIP: 0003@privatesip3) of the communication terminal 1051 under the management of the relay server 1053 of the relay destination. That is, the relay communication between the relay server 1053 and the relay server 1013 that is newly established is in a secret state with respect to the other relay server.

In addition, whether or not to permit exposure of the relay path to other relay servers is made. The relay path may be exposed only to a specific relay server. For instance, whether or not to expose as the attribute of the INVITE method can be specified (PUBLIC/PRIVATE) when establishing the relay communication session that is directly communicable with another relay server by the INVITE method. The exposure of the relay path with respect to the specific relay server can be permitted by specifying the specific relay server (e.g., PRIVATE=relay server 1023 or the like).

As described above, the communication terminals connected to the LAN 1001, LAN 1002, and LAN 1005 can communicate with the communication terminals connected to another LAN 1001, 1002, and 1005 via the Internet 1003 by using the communication system of the present preferred embodiment.

According to the present preferred embodiment, each relay server 1013, 1023, and 1053 does not need to establish a direct communication path. Indirect relay via the relay server is achieved, and the communication load between the relay servers is reduced.

Since the relay servers establish the communication path automatically and in real time, dynamic response is achieved even if the registered account information or the like is changed due to movement or the like, of the communication terminal.

The information on the established communication path can be held in a secret state. Furthermore, whether or not to request for the change notification of the relay information to the opposing relay server can be selected when establishing the relay path.

Third Preferred Embodiment

Figure 13:
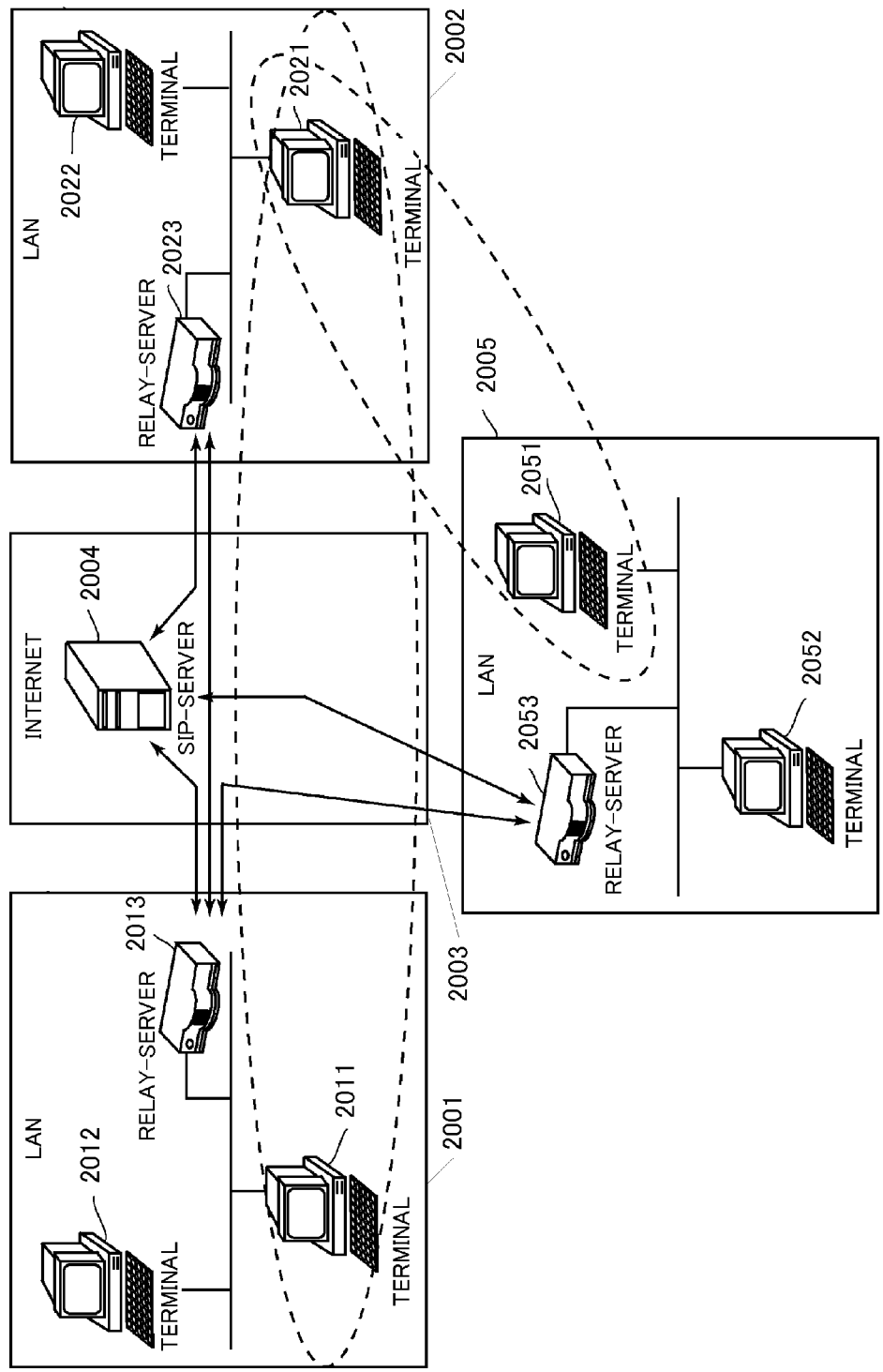
FIG. 13 is a network configuration view of a communication system according to a third preferred embodiment of the present invention.

A third preferred embodiment of the present invention will now be described with reference to the drawings. FIG. 13 is an overall view of a communication system according to the present preferred embodiment. The communication system preferably includes an Internet 2003, and three LANs 2001, 2002, and 2005 connected to the Internet 2003. The LANs 2001, 2002, and 2005 are networks at physically remote locations. For example, the LAN 2001 is a local network in the central office building, whereas the LANs 2002 and 2005 are local networks respectively provided in other branch office buildings, where the three LANs 2001, 2002, and 2005 are respectively connected to the Internet 2003, which is a global network.

As illustrated in FIG. 13, communication terminals 2011, 2012, 2021, 2022, 2051, and 2052 are connected to the respective LAN 2001, 2002, and 2005. A private IP address managed uniquely only in the respective LAN is given to each communication terminal. An account associated with the private IP address is given to each communication terminal. In the communication system of the present preferred embodiment, the account of each communication terminal 2011, 2012, 2021, 2022, 2051, and 2052 existing on each LAN 2001, 2002, and 2005 are all managed in an integrated fashion by a network manager. A conceptual view is shown in FIG. 14. As illustrated in FIG. 14, an account is given to each communication terminal, and is uniquely managed in the communication system. Therefore, each communication terminal can be dynamically responded to even if the communication terminal moves over the LAN as long as it is in the communication system since the communication terminal can be specified based on the account.

Each relay server 2013, 2023, and 2053 is connected to each LAN 2001, 2002, and 2005. Each relay server 2013, 2023, and 2053 is connected to each LAN 2001, 2002, and 2005 and is also connected to the Internet 2003. An LAN interface private IP address and a WAN interface global IP address are given to each relay server 2013, 2023, and 2053. Similar to the communication terminal, each relay server is given an account associated with the IP address.

An SIP server 2004 is connected to the Internet 2003. The SIP server 2004 functions as a proxy server for relaying SIP method and response, and functions as a SIP register server for registering the account of the relay servers 2013, 2023, and 2053 when the relay servers 2013, 2023, and 2053 perform the communication using the SIP (Session Initiation Protocol).

The relay server 2013 connected to the LAN 2001 functions as a SIP register server for registering the accounts of the communication terminals 2011, 2012, and the like connected to the LAN 2001 using the SIP.

Figure 15:
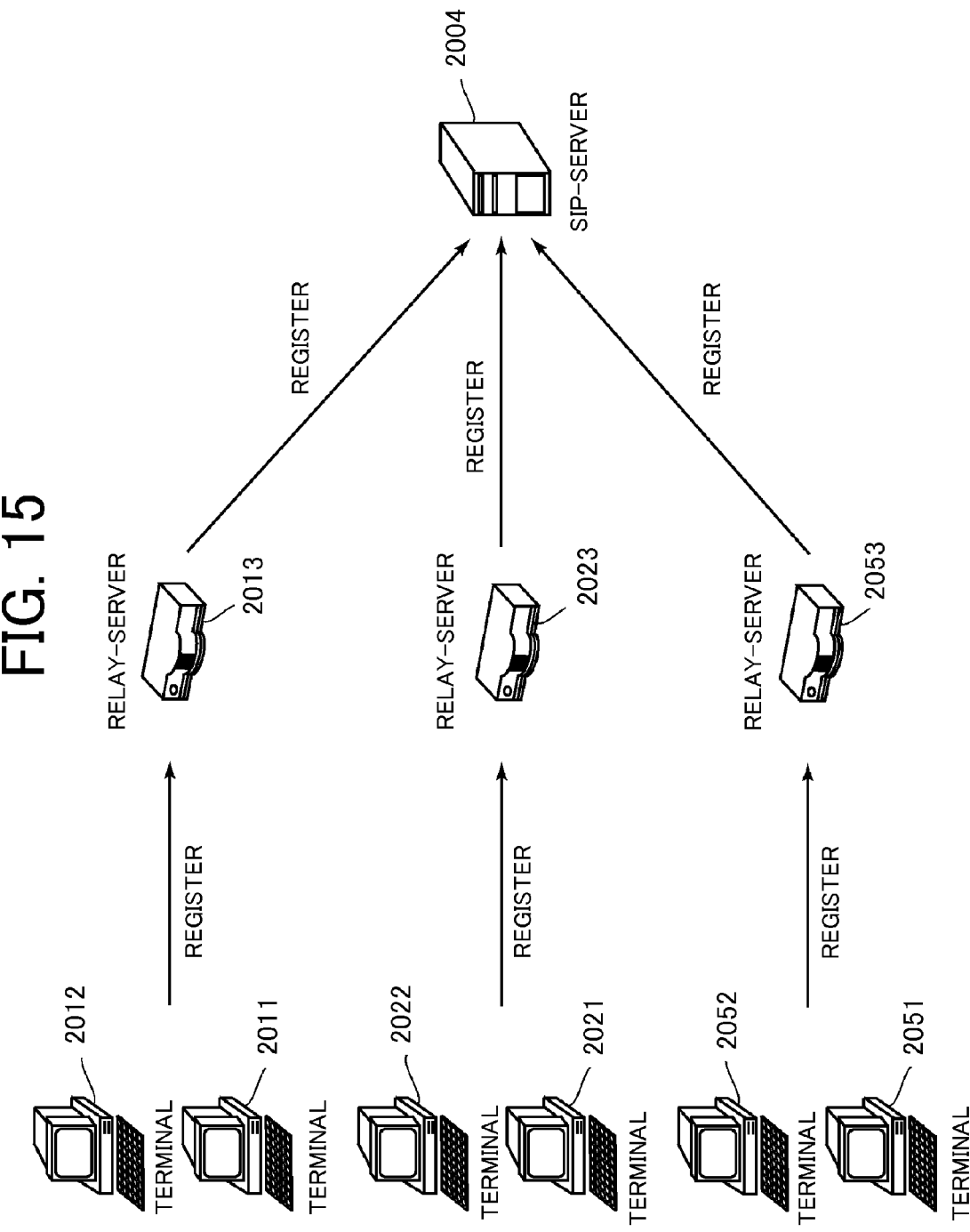
FIG. 15 is view showing a relationship of the communication terminals and relay servers, and a relationship between the relay servers and a SIP server.

That is, as illustrated in FIG. 15, the relay server 2013 functions as the SIP register server to register the account based on the registration request (REGISTER) received from the communication terminals 2011, 2012 in relation with the communication terminals 2011, 2012, and functions as a client to transmit the registration request (REGISTER) of the account to the SIP server 2004 in relation with the SIP server 2004.

Similarly, each relay server 2023, 2053 connected to the LANs 2002 and 2005 functions as a SIP register server to register the account of the communication terminals 2021, 2022 and the like, and 2051, 2052 and the like connected to the LANs 2002, 2005 using the SIP, and functions as a client in relation with the SIP server 2004.

Figure 16:
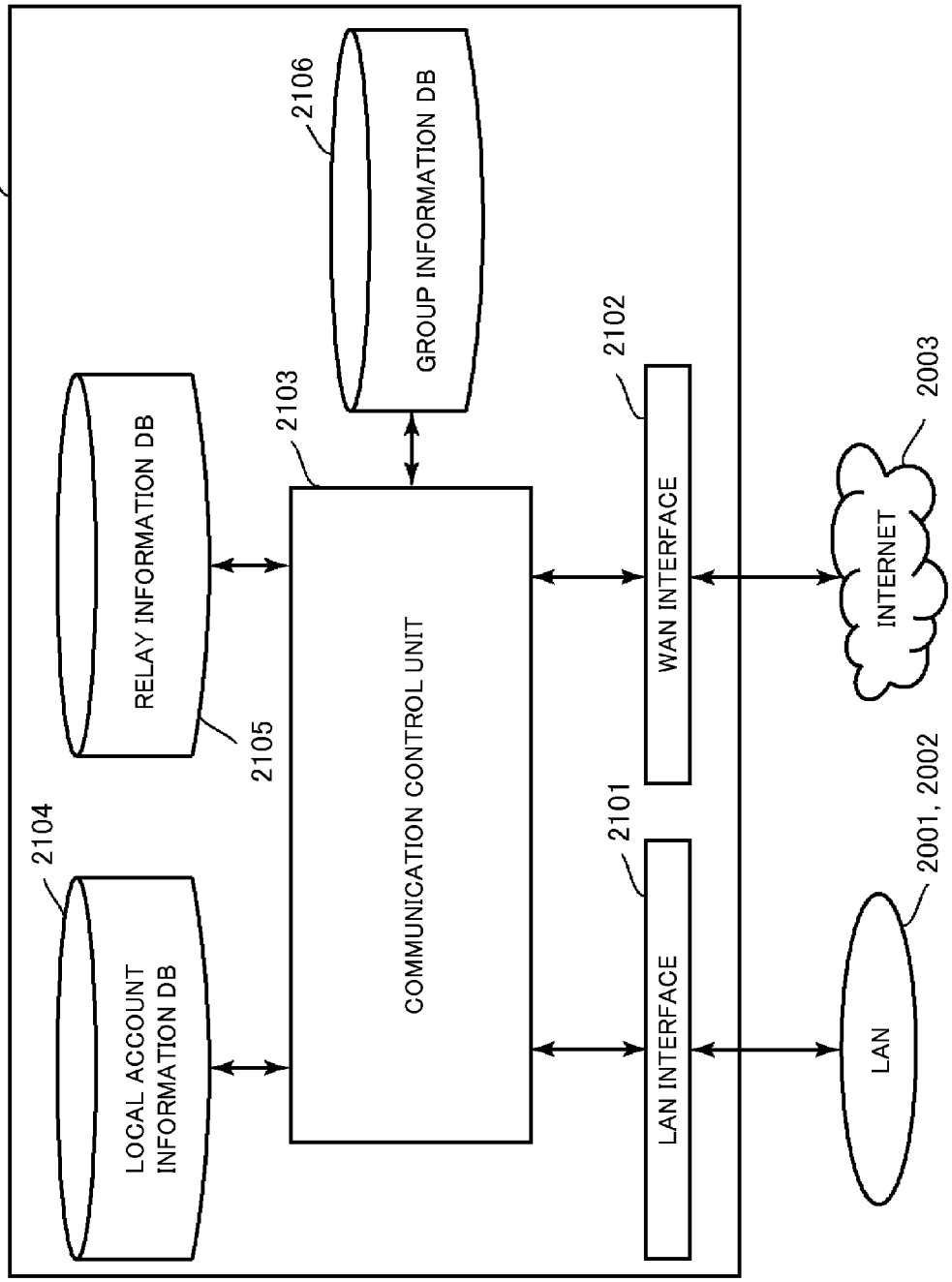
FIG. 16 is a functional block diagram of the relay server.

FIG. 16 is a functional block diagram of the relay servers 2013, 2023, and 2053. The relay servers 2013, 2023, and 2053 preferably have a similar function, and thus will be described using the same figure. The relay servers 2013, 2023, and 2053 preferably include a LAN interface 2101, a WAN interface 2102, a communication control unit 2103, a local account information database 2104, a relay information database 2105, and a group information database 2106.

The LAN interface 2101 is an interface that performs communication with the communication terminal connected to the LAN using the private IP address. That is, the relay server 2013 performs communication with the communication terminals 2011, 2012, and the like using the LAN interface 2101, the relay server 2023 performs communication with the communication terminals 2021, 2022, and the like using the LAN interface 2101, and the relay server 2053 performs communication with the communication terminals 2051, 2052, and the like using the LAN interface 2101.

The WAN interface 2102 is an interface that performs communication with the SIP server 2004 connected to the Internet 2003, which is the global network, and other communication servers connected to the Internet 2003 and communication terminals using the global IP address. In the present preferred embodiment, the relay server preferably is configured with the WAN interface, but a connection to the WAN may be performed by a router and the relay server may be arranged to serve therebelow.

The communication control unit 2103 preferably is a processing unit for controlling various communications performed through the LAN interface 2101 and the WAN interface 2102. The communication control unit 2103 controls various communication processes according to protocols such as TCP/IP, UDP, SIP or the like. The communication control unit 2103 particularly performs a control of each of account information, relay information, and group information using the local account information database 2104, the relay information database 2105, and the group information database 2106 and a control of relay sessions.

The communication control unit 2103 receives a registration request (REGISTER) of the account from the communication terminal connected to the LAN, and registers the account information of the communication terminal in the local account information database 2104. For example, the relay server 2013 receives the registration request (REGISTER) of the account from the communication terminal 2011 and registers the account information of the communication terminal 2011 in the local account information database 2104.

The communication control unit 2103 exchanges account information with another relay server, transmits its own account information to the relay server thereof, receives the account information held by the relevant relay server, and registers the information in its own local account information database 2104. When the account information held by the relay server is changed, a change notification setting of requesting to continuously transmit the change notification and account information after the change is performed on another relay server, where the change notification and the account information after the change are transmitted to the relay server in which the change notification setting is performed when its own account information is changed. This process is performed using a notification event by methods of SUBSCRIBE and NOTIFY in the SIP as hereinafter described. The period of executing the notification event is set in the notification event. The change notification setting using the notification event is performed by transmitting the SUBSCRIBE method through operator control or the like. Subsequently, if the account information of the relay server on the side receiving the SUBSCRIBE method is changed thereafter during the period the notification event can be executed, the change notification and the notification of the new account information are provided every time to the relay server on the side transmitting the SUBSCRIBE method by the NOTIFY method.

The notifying account information is registered in the local account information database 2104. If a change is made, the content after the change is registered every time, and continuously updated.

The communication control unit 2103 exchanges relay information including relay path information of the relay communication session being established with another relay server. The communication control unit 2103 transmits its own relay information to the relay server thereof, receives the relay information held by the relevant relay server, and registers the information in its own relay information database 2105. When the relay information held by the relay server is changed, the change notification setting of requesting to continuously transmit change notification and relay information after the change is performed on another relay server. The change notification and the relay information after the change are transmitted to the relay server in which the change notification setting is performed when the relay information of the relay server is changed. The processes are performed using a notification event by methods of SUBSCRIBE and NOTIFY, similar to the previous account information.

The notifying relay information is registered in the relay information database 2105. If the change is made, the content after change is registered every time, and continuously updated.

When establishing a relay communication session that is directly communicable with another relay server by the INVITE method, whether or not to transmit the change notification and the relay information after the change can be specified when its own relay information is changed on the relay server in which the change notification setting is performed. That is, when specified not to transmit, even if the change notification setting is performed by transmission of the SUBSCRIBE method from another relay server, the relay server does not transmit the change notification of the relay information and the relay information after the change by the NOTIFY method based thereon.

Similarly, when establishing a relay communication session that is directly communicable with another relay server by the INVITE method, whether or not to include the relay path information formed by the communication session in the relay information can be specified. That is, the relay server can hold the relay communication session to be newly established in a secret state by specifying not to include the relay path information in the relay information.

The group information is information of a private network group virtually formed on the network. The account information of a group of communication terminals grouped over the connected LAN is contained therein. For instance, in the present communication system, the communication terminal 2011 and the communication terminal 2021, and the communication terminal 2021 and the communication terminal 2051 are grouped as a private network group over the respectively connected LAN, as illustrated with a broken line in FIG. 13. The network group is a network that can communicate between the communication terminals within the same group, but that which is closed and does not accept communications from the communication terminals outside the group. The relay server can receive the group information from the communication terminal, and also from the relay server.

When the group information held in the relay server is changed, the change notification setting requesting to continuously transmit the change notification and the group information after change is performed on another relay server. The change notification and the group information after change are transmitted to the relay server in which the change notification setting is performed when its own group information is changed. The processes are performed using a notification event by methods of SUBSCRIBE and NOTIFY, similar to the previous information.

The received group information is registered in the group information database 2106. If the change is made, the content after change is registered every time, and continuously updated.

A function of accepting the transmission request of the group information from the communication terminal connected to the LAN, extracting only the group information in which the relevant communication terminal is registered, and returning the information is also provided. Therefore, the user using the communication terminal is able to easily know the communication terminal participating in the same group as the relevant communication terminal.

A function of receiving the edited group information from the communication terminal connected to the LAN and updating its own group information is also provided. Therefore, if the group information is edited in one of the communication terminals, and the information is transmitted to the relay server of the LAN to which the relevant communication terminal is connected to update the group information thereof, the group information automatically updated between the relay servers is transmitted and received, and thus shared by the change notification setting of the previous group information. Thus, a troublesome procedure is not required even if the registered content of the private network group by movement or the like of the communication terminal is changed, and a very user-friendly system is achieved.

The communication control unit 2103 also has a function of connecting and maintaining a tunneling session with the relay servers 2013, 2023, and 2053 on the opposing side. That is, the relay servers 2013, 2023, and 2053 transmit the INVITE method of SIP from any one server to establish the tunneling session between the relay servers 2013, 2023, and 2053. The communication control units 2103 of the relay servers 2013, 2023, and 2053 maintain the established tunneling session to relay the communication data between the communication terminals connected to the LANs 2001, 2002, and 2005.

In other words, since a unique account is given to the communication terminals connected to LANs 2001, 2002, and 2005, the unique account of the destination is specified when communicating with the communication terminal arranged in a different LAN 2001, 2002, and 2005 from each other. However, the communication data such as the SIP command in which the account is specified is encapsulated between the relay servers 1013, 1023, and 1053 and relayed to the other relay server 1013, 1023, and 1053. The relay server 2013, 2023, and 2053 on the receiving side retrieves the relayed SIP command and relays and transmits the communication data specifying the unique account to the corresponding communication terminal.

The communication control unit 2103 also performs an indirect relay control. When receiving a communication request specifying the account of the communication terminal in another LAN from the communication terminal in the same LAN, the relay server in which the specified account is registered from the account information received from another relay server is determined. Whether or not a directly communicable relay communication session is established with the relevant relay server is detected. If the directly communicable relay communication session is not established, the relay path is determined from the exchanged relay information, and the communication data between the communication terminals is indirectly relayed through the relay communication session with the relay server on the relay path.

The communication control unit 2103 also has a function of transmitting a registration request (REGISTER) for performing account registration of the relay server itself on the SIP server 2004.

Figure 17:
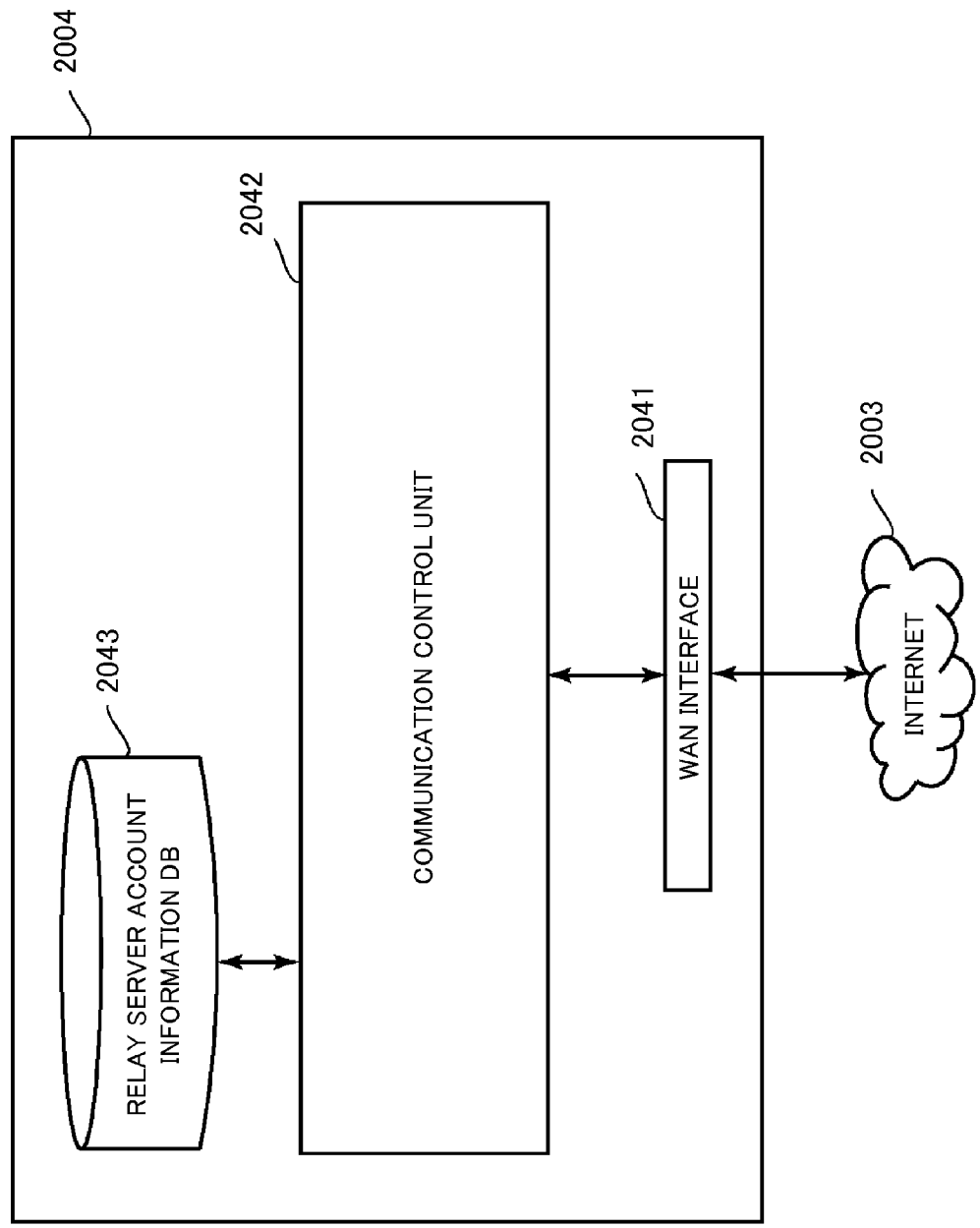
FIG. 17 is a functional block diagram of the SIP server.

FIG. 17 is a functional block diagram of the SIP server 2004. The SIP server 2004 preferably includes a WAN interface 2041, a communication control unit 2042, and a relay server account information database 2043.

The WAN interface 2041 is an interface that performs communication between the server connected to the Internet 2003 and the terminal using the global IP address. The SIP server 2004 can communicate with the relay servers 2013, 2023, and 2053 using the WAN interface 2041.

The communication control unit 2042 preferably is a processing unit for controlling various communications performed through the WAN interface 2041. The communication control unit 2042 controls the communication process according to protocols such as TCP/IP, UDP, SIP, or the like.

One function of the communication control unit 2042 is to receive the registration request (REGISTER) of the account from the relay server connected to the Internet 2003, and to register the account information of the relay server in the relay server account information database 2043. For instance, the SIP server 2004 receives the registration request (REGISTER) of the account from the relay server 2013, and registers the account information of the relay server 2013 in the relay server account information database 2043.

The communication control unit 2042 also has a function of relaying communication data such as various SIP methods and responses transmitted from the relay servers 2013, 2023, and 2053 to the other relay server.

Figure 18:
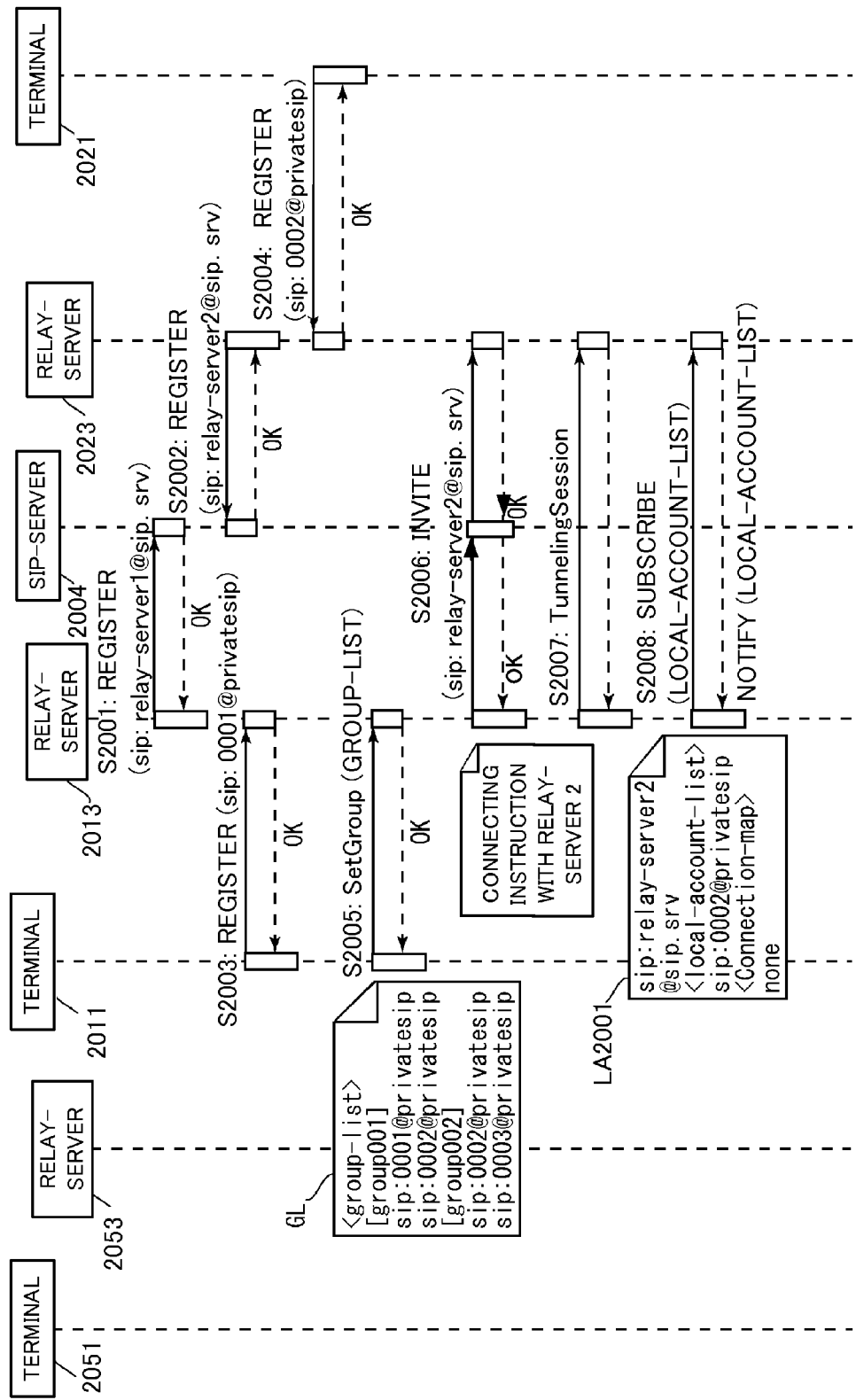
FIG. 18 is a sequence diagram of a communication process.

The flow of communication process in the communication system configured as described above will now be described with reference to the processing sequence diagrams of FIGS. 18 to 20. Note that FIG. 18 shows a sequence from step S2001 to step S2008, FIG. 19 shows a sequence from step S2009 to step S2015, and FIG. 20 shows a sequence from step S2016 to step S2018.

As illustrated in FIG. 13, the communication terminal 2011 and the communication terminal 2021, and the communication terminal 2021 and the communication terminal 2051 are preferably grouped as two private network groups over the respectively connected LAN (illustrated with a broken line in FIG. 13). The relay communication session is established between the relay server 2013 and the relay server 2023, and between the relay server 2013 and the relay server 2053 (illustrated with an arrow line in FIG. 13). The flow of communication processes until the transmission and reception of the communication data between the communication terminals is relayed through the relay server is illustrated. Each step will be described in order.

First, the relay server 2013 transmits the registration request (REGISTER) of the account to the SIP server 2004. As illustrated in FIG. 18, the relay server 2013 makes a registration request of its account (SIP: relay-server1@sip.srv). The SIP server 2004 returns an OK response to the relay server 2013, whereby the account of the relay server 2013 and the global IP address of the relay server 2013 are registered in the relay server account information database 2043 in correspondence to each other. When performing a password authentication, the account of the relay server and a password are registered in the relay server account information database 2043 in advance in correspondence to each other. In this case, the user transmits the password with the registration request. If password authentication is successful, the account is registered in correspondence to the IP address.

Subsequently, the relay server 2023 transmits the registration request (REGISTER) to the SIP server 2004. The relay server 2023 makes the registration request of its account (SIP: relay-server2@sip.srv). The SIP server 2004 returns an OK response to the relay server 2023, whereby the account of the relay server 2023 and the global IP address of the relay server 2023 are registered in the relay server account information database 2043 in correspondence to each other. Similarly, the password authentication may be performed.

The communication terminal 2011 then transmits the registration request (REGISTER) of the account to the relay server 2013. The communication terminal 2011 makes a registration request of its account (SIP: 0001@privatesip). The relay server 2013 returns an OK response, whereby the account of the communication terminal 2011 and the private IP address of the communication terminal 2011 are registered in the local account information database 2104 in correspondence to each other. When performing a password authentication, the account of the communication terminal and a password are registered in the local account information database 2104 in advance in correspondence to each other. In this case, the user transmits the password with the registration request. If password authentication is successful, the account is registered in correspondence to the IP address.

The communication terminal 2021 then transmits the registration request (REGISTER) of the account to the relay server 2023. The communication terminal 2021 makes a registration request of its account (SIP:0002@privatesip). The relay server 2023 returns an OK response, whereby the account of the communication terminal 2021 and the private IP address of the communication terminal 2021 are registered in the local account information database 2104 in correspondence to each other. In this case as well, password authentication may be performed.

Accordingly, the account registration of the relay servers 2013, 2023 with respect to the SIP server 2004 is completed, and the account registration of the communication terminals 2011, 2021 with respect to the relay servers 2013, 2023 is completed.

The next step S2005 shows the registration process of the group information. The registration of the group information can be performed from any communication terminal connected to the network of the communication system. The group information merely needs to be registered in any one of the relay servers on the network. Once the group information is registered in any one of the relay servers on the network, the group information is automatically transmitted and received in a chain reaction between the relay servers, so that the group information can be shared among the relay servers. A case performed from the communication terminal 11 is described herein.

The communication terminal 2011 transmits a registration request command (Set Group) of the group information to the relay server 2013. The content of the group information (GL) to be transmitted is illustrated in the sequence diagram of FIG. 18. Two groups of a group constituted by the communication terminal 2011 and the communication terminal 2021, and a group constituted by the communication terminal 2021 and the communication terminal 2051 are formed, and the account information of the grouped communication terminals are recorded under a group marker indicating the group. Specifically, a group marker (group001) is given to the account (SIP: 0001@privatesip) of the communication terminal 2011 and the account (SIP: 0002@privatesip) of the communication terminal 2021 that are grouped; and a group marker (group002) is given to the account (SIP: 0002@privatesip) of the communication terminal 2021 and the account (SIP: 0003@privatesip) of the communication terminal 2051 that are grouped, which are then registered in the group information database 2106.

When receiving the group information and the registration request command thereof from the communication terminal 2011, the relay server 2013 transfers an OK response to the communication terminal 2011.

The relay server 2013 transmits a connection request command (INVITE method) with respect to the relay server 2023 to the SIP server 2004. The account (SIP:relay-server2@sip.srv) of the relay server 2023 of connection request destination is specified in the INVITE method. The SIP server 2004 references the relay server account information 2043 to acquire the global IP address of the relay server 2023. The SIP server 2004 then relays the INVITE message transmitted from the relay server 2013 to the relay server 2023.

When the connection request command is transmitted from the relay server 2013 to the relay server 2023, an OK response is transferred from the relay server 2023 to the relay server 2013 via the SIP server 2004.

If the connection request command is accepted in such a manner, a tunneling session is established between the relay servers 2013 and 2023.

The processes from step S2001 to S2007 are generally performed as an initial setting of the network by the operator. The operator performs the operation of registering in the SIP server 2004 the relay server arranged in the LAN the operator desires to connect to via the Internet 2003. The operator also performs the operation of registering in the relay server the communication terminal to which the operator desires to communicate to via the Internet 2003. The operator then performs the operation of registering the group information in one of the relay servers on the network from the communication terminal.

The relay server 2013 performs the change notification setting using the notification event between the relay server 2013 and the relay server 2023 with respect to the relay server 2023 using the SUBSCRIBE method. The SUBSCRIBE method is transmitted directly or via the SIP server 2004 to the relay server 2013. Thus, if the account information, the relay information, or the group information held by the relay server 2023 is changed, the change notification and the account information after change, the relay information after change, or the group information after change will be notified from the relay server 2023 to the relay server 2013 by the NOTIFY method each time. Since the account information and the relay information are contained in the local account information LA, the local account information after change merely needs to be collectively notified if change is made.

The content of the local account information LA2001 notified from the relay server 2023 to the relay server 2013 by the NOTIFY method based on the SUBSCRIBE method of step S2008 is illustrated in the sequence diagram of FIG. 18.

The local account information LA2001 includes information of the communication terminal connected to the LAN 2002 in which the relay server 2023 is arranged, which communication terminal having performed account registration with respect to the relay server 2023. In this case, since the communication terminal 2021 had made the account registration with respect to the relay server 2023, the account information (SIP:0002@privatesip) of the communication terminal 2021 is recorded in the local account information LA2001.

The relay server 2013 that has received the local account information LA2001 registers the information in its own local account information database 2104. The received account information, however, is registered in correspondence to the account information of the relay server, which is the source of the relevant account information. In this case, the account (SIP:0002@privatesip) of the communication terminal 2021 is registered in correspondence to the account (SIP:relay-server2@sip.srv) of the relay server 2023.

The local account information LA2001 includes relay information containing the relay path information of the directly communicable communication session established by the relay server 2023. However, since the relay server 2023 has not yet established the directly communicable communication session other than with the relay server 2013, the fact that the relay path information contained in the relay information is not present (none) is recorded. The relay server 2013 that has received the local account information LA2001 registers the information in its own relay information database 2105 in correspondence to the account information (SIP:relay-server2@sip.srv) of the relay server 2023, which is the source of the relevant relay information.

Since the group information is already registered in the relay server 2013 (see step S2005), a request for transmission of the group information is not performed on the relay server 2023.

As illustrated in FIG. 19, the relay server 2023 then performs the change notification setting using the notification event with the relay server 2013 with respect to the relay server 2013 using the SUBSCRIBE method. Thus, if the account information, the relay information, or the group information held by the relay server 2013 is changed, the change notification and the account information after change, the relay information after change, and the group information after change will be notified from the relay server 2013 to the relay server 2023 by the NOTIFY method each time.

The relay server 2023 does not hold the group information. Thus, request for transmission of the group information is made with the change notification setting with respect to the relay server 2013.

The content of the local account information LA2002 notified from the relay server 2013 to the relay server 2023 by the NOTIFY method based on the SUBSCRIBE method of step S2009 is illustrated along with the group information notified at the same time in the sequence diagram of FIG. 19. The local account information LA2002 includes information of the communication terminal connected to the LAN 2001 in which the relay server 2013 is arranged, which communication terminal having performed account registration with respect to the relay server 2013. The relay server 2023 registers the information in its own local account information database 2104. In this case, the account (SIP:0001@privatesip) of the communication terminal 2011 and the account (SIP: relay-server1@sip.srv) of the relay server 2013 are registered in the local account information database 2104 in correspondence to each other.

The local account information LA2002 includes relay information containing the relay path information of the directly communicable communication session established by the relay server 2013. However, since the relay server 2013 has not yet established the directly communicable communication session other than with the relay server 2023, the fact that the relay path information contained in the relay information is not present (none) is recorded. The relay server 2023 that has received the local account information LA2002 registers the information in its own relay information database 2105 in correspondence to the account information (SIP: relay-server1@sip.srv) of the relay server 2013, which is the source of the relevant relay information.

The group information held by the relay server 2013 is transmitted. The relay server 2023 registers the information in its own group information database 2106.

By accessing the relay server 2013, the communication terminal 2011 connected to the LAN 2011 can reference the local account information database 2104, the relay information database 2105, and the group information database 2106 managed by the relay server 2013. For instance, the user of the communication terminal 2011 can reference the content of the local account information database 2104 through the operation of referencing an address book. Similarly, the communication terminal 2021 connected to the LAN 2002 can reference the local account information database 2104 or the like managed by the relay server 2023.

The relay communication session is thus directly established between the relay server 2013 and the relay server 2023. The flow of communication processes for establishing the relay communication session directly between the relay server 2013 and the relay server 2053 will now be described.

The relay server 2053 transmits the registration request (REGISTER) of the account to the SIP server 2004. The relay server 2053 makes a registration request of its account (SIP: relay-server3@sip.srv). The SIP server 2004 returns an OK response to the relay server 2053, whereby the account of the relay server 2053 and the global IP address of the relay server 2053 are registered in the relay server account information database 2043 in correspondence to each other. Similarly, the password authentication may be performed.

The communication terminal 2051 then transmits the registration request (REGISTER) of the account to the relay server 2053. The relay server 2053 returns an OK response to the communication terminal 2051, and registers the account (SIP: 0003@privatesip) of the communication terminal 2051 and the private IP address of the communication terminal 2051 in the local account information database 2104 in correspondence to each other.

The relay server 2053 transmits a connection request command (INVITE method) with respect to the relay server 2013 to the SIP server 2004. The account (SIP:relay-server1@sip.srv) of the relay server 2013 of connection request destination is specified in the INVITE method. The SIP server 2004 references the relay server account information 2043 to acquire the global IP address of the relay server 2013. The SIP server 2004 then relays the INVITE message transmitted from the relay server 2053 to the relay server 2013.

When the connection request command is transmitted from the relay server 2053 to the relay server 2013, an OK response is transferred from the relay server 2013 to the relay server 2053 via the SIP server 2004.

If the connection request command is accepted in such a manner, a tunneling session is established between the relay servers 2053 and 2023. The processes from step S2010 to S2013 are performed by the operator.

The relay server 2053 performs the change notification setting using the notification event with the relay server 2013 using the SUBSCRIBE method with respect to the relay server 2013. If the account information, the relay information, or the group information held by the relay server 2013 is changed, the change notification and the account information after the change, the relay information after the change, or the group information after the change will be notified from the relay server 2013 to the relay server 2053 by the NOTIFY method each time.

The relay server 2053 does not hold the group information. Thus, request for transmission of the group information is made with the change notification setting on the relay server 2013.

The content of the local account information LA2003 notified from the relay server 2013 to the relay server 2053 by the NOTIFY method based on the SUBSCRIBE method of step S2014 is illustrated along with the group information notified at the same time in the sequence diagram of FIG. 19. The local account information LA2003 includes information of the communication terminal connected to the LAN 2001 in which the relay server 2013 is arranged, which communication terminal having performed account registration with respect to the relay server 2013. In this case, since the communication terminal 2011 had made account registration with respect to the relay server 2013, the account information (SIP:0001@privatesip) of the communication terminal 2011 is recorded in the local account information LA2003.

The relay server 2013 establishes a communication session, which is directly communicable with the relay server 2023, and thus relay path information (SIP: relay-server2@sip.srv) indicating that the directly communicable communication session is established with the relay server 2023 is recorded in the relay information. The relay path information is also recorded with the account information (SIP: 0002@privatesip) of the communication terminal 2021 connected to the LAN 2002 in which the relay server 2023 is arranged, which communication terminal having performed account registration with respect to the relay server 2023.

The relay server 2053 that has received the local account information LA2003 registers the received account information in its own local account information database 2104. The received account information, however, is registered in correspondence to the account information of the relay server, which is the source of the relevant account information. In this case, the account (SIP:0001@privatesip) of the communication terminal 2011 is registered in correspondence to the account (SIP:relay-server1@sip.srv) of the relay server 2013.

The relay server 2053 registers the received relay information in its own relay information database 2105. In this case, the relay path information (SIP: relay-server2@sip.srv) is registered with the account information (SIP: 0002@privatesip) of the communication terminal 2021 under the management of the relay server 2023 in correspondence to the account (SIP: relay-server1@sip.srv) of the relay server 2013.

The group information held by the relay server 2013 is transmitted. The relay server 2053 registers the information in its own group information database 2106.

Thus, sharing of group information among the relay servers 2013, 2023, and 2053 on the network on which the relay sessions are established is achieved. That is, the group information can be transmitted and received, and thus shared in chain reaction with the relay servers on the network, by simply registering the group information in the relay server 2014 in previous steps S2005.

The relay server 2013 then performs the change notification setting using the notification event with the relay server 2053 with respect to the relay server 2053 using the SUBSCRIBE method. Thus, if the account information, the relay information, or the group information contained in the local account information held by the relay server 2053 is changed, the change notification and the account information after the change, the relay information after the change, or the group information after the change will be notified from the relay server 2053 to the relay server 2013 by the NOTIFY method each time.

The content of the local account information LA2004 notified from the relay server 2053 to the relay server 2013 by the NOTIFY method based on the SUBSCRIBE method of step S2015 is illustrated in the sequence diagram of FIG. 19. The local account information LA2004 includes information of the communication terminal connected to the LAN 2005 in which the relay server 2053 is arranged, which communication terminal having performed account registration with respect to the relay server 2053. The relay server 2013 registers the received account information in its own local account information database 2104. In this case, the account (SIP: 0003@privatesip) of the communication terminal 2051 and the account (SIP: relay-server3@sip.srv) of the relay server 2053 are registered in the local account information database 2104 in correspondence to each other.

The local account information LA2004 includes relay information of the relay server 2053, but since the relay server 2053 has not yet established the directly communicable communication session other than with the relay server 2013, the fact that the relay path information contained in the relay information is not present (none) is recorded. The relay server 2013 that has received the local account information LA2004 registers the information in its own relay information database 2105 in correspondence to the account information (SIP: relay-server3@sip.srv) of the relay server 2053, which is the source of the relevant relay information.

Since the relay server 2013 holds the group information therein, a request for transmission of the group information is not made.

In this manner, the relay server 2053 and the relay server 2013 exchange the local account information LA2003, LA2004, and register the respectively acquired information in the local account information database 2104, the relay information database 2105, and the group information database 2106.

In the relay server 2013, the relay information changes since the directly communicable relay communication session is established between the relay server 2013 and the relay server 2053. As a result, the local account information LA2005 including the change notification and the relay information after change is notified from the relay server 2013 to the relay server 2023 by the NOTIFY method based on the change notification setting (step S2009) previously carried out between the relay server 2013 and the relay server 2023.

The content of the local account information LA2005 is illustrated in the sequence diagram of FIG. 20. The local account information LA2005 includes the information (SIP: 0001@privatesip) of the communication terminal that has performed the account registration with respect to the relay server 2013 in correspondence to the account (SIP:relay-server1@sip.srv) of the relay server 2013, where the communication terminal is connected to the LAN 2001 in which the relay server 2013 is arranged. The relay path information (SIP: relay-server3@sip.srv) indicating that a new directly communicable communication session is established between the relay server 2013 and the relay server 2053 is recorded as the relay information in correspondence to the account information (SIP: 0003@privatesip) of the communication terminal 2051 under the management of the relay server 2053.

The relay server 2023 registers the received account information in its own local account information database 2104 in a state corresponding to the account information (SIP: relay-server1@sip.srv) of the relay server 2013, registers the received relay information in its own relay information database 2105, and updates the information after change.

The transmission and reception of communication data between the communication terminals performed on the established network will now be described.

In step S2017, the user of the communication terminal 2011 attempts to make access to the communication terminal 2051. The SIP command having the communication terminal 2051 as the destination is transmitted from the communication terminal 2011 to the relay server 2013. When receiving the SIP command, the relay server 2013 references its own group information database, and checks whether the communication terminal 2011 of transmission source and the communication terminal 2051 of destination are registered in the same group (Check Group command). Since the communication terminals 2011, 2051 are not registered in the same group herein (see FIG. 13), the relay server 2013 returns an error response to the communication terminal of transmission source.

In step S2018, the user of the communication terminal 2021 attempts to make access to the communication terminal 2051. The SIP command having the communication terminal 2051 as the destination is transmitted from the communication terminal 2021 to the relay server 2023. When receiving the SIP command, the relay server 2023 references its own group information database, and checks whether the communication terminal 2021 of transmission source and the communication terminal 2051 of destination are registered in the same group (Check Group command). Since the communication terminals 2021, 2051 are registered in the same group herein (see FIG. 13), the relay serer 2023 references the local account information database 2104 and specifies the relay server in which the relevant destination account is registered. In this case, the account of the communication terminal 2051 is registered in correspondence to the relay server 2105, and thus the relay server 2053 is selected as the relaying destination.

Whether or not the directly communicable relay communication session is established between the relay server 2023 and the relay server 2053 is detected. If the directly communicable relay communication session is established, the direct communication data is transmitted to the relay server 2053. The directly communicable relay communication session is not established between the relay server 2023 and the relay server 2053. The relay server 2023 then references the relay information database 2105 and determines the relay path from the exchanged relay information.

Specifically, the relay information held in its own relay information database 2105 is recorded with the fact that the relay server 2013 having established the relay communication session with the relay server 2023 has established the relay communication session between the relay server 2023 and the relay server 2053 (see local account information LA2005). Therefore, the indirect relay path with the relay server 2053 via the relay server 1013 can be determined with reference thereto. Indirect relay through the relay server has an advantage of reducing the communication load between the relay servers.

When the relay path is determined, the relay server 2023 directly transfers the SIP command received from the communication terminal 2021 to the relay server 2013 using the tunneling session (step S2018.1). The relay server 2013 directly transfers the SIP command received from the relay server 2023 to the communication terminal 2053 (step S2018.1.1). The SIP command is transferred from the relay server 2053 to the communication terminal 2051 (step S2018.1.1.1). The SIP command transmitted from the communication terminal 2021 is thereby transferred to the communication terminal 2051.

When receiving the SIP command transmitted from the communication terminal 2021, the communication terminal 2051 returns the SIP response to the communication terminal 2021. The response is again transferred from the relay server 2053 to the relay server 2023 via the relay server 2013 using the tunneling session, and then transferred to the communication terminal 2021 by the relay server 2023.

Each communication terminal can extract and receive only the group information in which the communication terminal is registered from the relay server. For instance, if the communication terminal 2011 accesses the relay server 2013 and makes a transmission request for the group information, the relay server 2013 extracts and returns the information on the group (0001) in which the account (SIP: 0001@privatesip) of the communication terminal 2011 is registered in the group information. Therefore, the user is able to easily know the state of the private network group configured on the network from each terminal.

The relay server can receive the group information from each communication terminal connected to the LAN and update the group information held therein. For instance, assume a new private network is established. The operator transmits new group information including the new private network from one of the communication terminals to the relay server connected to the same LAN. The relay server that has received the information updates its own group information database 2106. The updated group information is then transmitted to and received in a chain reaction at other relay servers in which the relay session is established and the relay servers in which the relay session is to be established. Ultimately, the updated group information is automatically shared by all the relay servers.

Furthermore, even if the communication terminal moves to a different LAN and the account registration is newly made on the relay server in the LAN, the account of the communication terminal is uniquely managed in an integrated fashion, as illustrated in FIG. 14, and thus the private network group or the like can be used as it is, and in the case the account information or the like is changed, the update of the related information is automatically performed among the relay servers, and thus can be dynamically responded.

While the present invention has been described with respect to preferred embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. A relay server device arranged in a local area network and being communicable with an external server arranged in a wide area network; the relay server comprising:

a local account information registering section arranged to register account information of a communication terminal in the local area network;

an account information exchanging section arranged to exchange the account information registered in the local account information registering section with another relay server arranged in another local area network;

a relay information exchange section arranged to exchange relay information with the another relay server, the relay information including first information related to a first relay communication session between the relay server and the another relay server and second information related to a second relay communication session between the another relay server and another further relay server;

a determining section arranged to determine, when receiving from the communication terminal in the local area network a communication request in which an account of another communication terminal is specified, the another further relay server in which the specified account of the another communication terminal is registered based on the account information and the relay information exchanged with the another relay server;

a detecting section arranged to detect whether or not a relay communication session that is communicable with the another further relay server is established when relaying communication data to the another communication terminal;

a relay server account information registering section arranged to register relay server account information in the external server;

an another relay server specifying section arranged to specify the another relay server and to establish a relay communication session that is communicable with the another relay server;

a relay information registering section arranged to register relay information including relay path information of the established relay communication session;

a change notification setting section arranged to request, when the relay information held by the another relay server is changed, the another relay server to transmit the changed relay information; and a relay path determining section arranged to determine a relay path from the relay information if the communicable relay communication session is not established, and to relay the communication data between the communication terminals through a relay communication session with the another relay server on the relay path; wherein when the detecting section detects that the relay communication session that is communicable with the another further relay server is not established, the relay server relays the communication data to the another further relay server through the another relay server, based on the relay information exchanged by the relay information exchange section; and whether or not to request transmission of the relay information after a change if the relay information of the another relay server is changed is specifiable when establishing the relay communication session communicable with the another relay server.

2. A relay server device arranged in a local area network and being communicable with an external server arranged in a wide area network; the relay server comprising:
 a local account information registering section arranged to register account information of a communication terminal in the local area network;
 an account information exchanging section arranged to exchange the account information registered in the local account information registering~section with another relay server arranged in another local area network;
 a relay information exchange section arranged to exchange relay information with the another relay server, the relay information including~first information related to a first relay communication session between the relay server and the another relay server and second information related to a second relay communication session between the another relay server and another further relay server;
 a determining section arranged to determine, when receiving~from the communication terminal in the local area network a communication request in which an account of another communication terminal is specified, the another further relay server in which the specified account of the another communication terminal is registered based on the account information and the relay information exchanged with the another relay server;
 a detecting section arranged to detect whether or not a relay communication session that is communicable with the another further relay server is established when relaying communication data to the another communication terminal;
 a relay server account information registering section arranged to register relay server account information in the external server;
 an another relay server specifying section arranged to specify the another relay server and to establish a relay communication session that is communicable with the another relay server;
 a relay information registering section arranged to register relay information including relay path information of the established relay communication session;
 a change notification setting section arranged to request, when the relay information held by the another relay server is changed, the another relay server to transmit the changed relay information; and
 a relay path determining section arranged to determine a relay path from the relay information if the communicable relay communication session is not established, and to relay the communication data between the communication terminals through a relay communication session with the another relay server on the relay path; wherein
 when the detecting section detects that the relay communication session that is communicable with the another further relay server is not established, the relay server relays the communication data to the another further relay server through the another relay server, based on the relay information exchanged by the relay information exchange section; and
 whether or not to include the relay path information formed by the communication session in the relay information is specifiable when establishing a communicable relay communication with the another relay server.

3. The relay server device according to claim 1, wherein whether or not to include the relay path information by the communication session in the relay information is specifiable when establishing a communicable relay communication with the another relay server.

4. The relay server device according to claim 1, wherein the external server is a SIP external server.

5. The relay server device according to claim 1, wherein the external server is a SIP external server.

* * * * *